US 9,143,750 B2

(12) United States Patent
Oh

(10) Patent No.: US 9,143,750 B2
(45) Date of Patent: Sep. 22, 2015

(54) APPARATUS AND METHOD FOR PROCESSING MEDIA IN CONVERGENCE MEDIA SERVICE PLATFORM

(71) Applicant: ELECTRONICS AND TELECOMMUNICATIONS RESEARCH INSTITUTE, Daejeon (KR)

(72) Inventor: Hyun-Woo Oh, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 182 days.

(21) Appl. No.: 13/729,308

(22) Filed: Dec. 28, 2012

(65) Prior Publication Data

US 2013/0322856 A1    Dec. 5, 2013

(30) Foreign Application Priority Data

May 30, 2012  (KR) .................. 10-2012-0057416

(51) Int. Cl.
| | |
|---|---|
| *H04N 9/79* | (2006.01) |
| *H04N 5/76* | (2006.01) |
| *H04N 9/82* | (2006.01) |
| *H04N 21/431* | (2011.01) |
| *H04N 21/854* | (2011.01) |

(52) U.S. Cl.
CPC . *H04N 9/79* (2013.01); *H04N 5/76* (2013.01); *H04N 9/7921* (2013.01); *H04N 9/8205* (2013.01); *H04N 21/4318* (2013.01); *H04N 21/854* (2013.01)

(58) Field of Classification Search
USPC ........................................... 386/280
See application file for complete search history.

(56) References Cited

U.S. PATENT DOCUMENTS

| | | | |
|---|---|---|---|
| 6,510,279 B1* | 1/2003 | Morishita .................. | 386/203 |
| 2007/0262088 A1* | 11/2007 | Nanda ....................... | 221/305 |
| 2008/0046944 A1* | 2/2008 | Lee et al. .................. | 725/110 |
| 2013/0103703 A1* | 4/2013 | Han et al. .................. | 707/755 |

FOREIGN PATENT DOCUMENTS

KR    1020080016393 A    2/2008

OTHER PUBLICATIONS

Hyunsoon Shin, et al; "Architecture of the SMMD Media Service System", E-Activites, vol. 6, 6th WSEAS International Conference on E-ACTIVITIES, Tenerife, Spain, Dec. 14-16, 2007; 6 pages.

* cited by examiner

*Primary Examiner* — Thai Tran
*Assistant Examiner* — Nien-Ru Yang
(74) *Attorney, Agent, or Firm* — Ladas & Parry LLP

(57) ABSTRACT

Disclosed herein are an apparatus and method for processing media in a convergence media service platform. The apparatus includes a media-based sensory effect (MSE) processing unit, an AV processing unit, a sensory effect processing unit, and a media creation unit. The MSE processing unit extracts one or more sensory effects from Audio/Video (AV) media. The AV processing unit separates AV media into an audio and a video, and decodes the AV media based on media format. The sensory effect processing unit adds the extracted sensory effects in synchronization with the waveform of the separate audio, and edits the attributes of the added sensory effects. The media creation unit creates convergence media by adding the added sensory effects to the AV media.

15 Claims, 21 Drawing Sheets

APPARATUS AND METHOD FOR PROCESSING MEDIA IN CONVERGENCE MEDIA SERVICE PLATFORM

CROSS REFERENCE TO RELATED APPLICATION

This application claims the benefit of Korean Patent Application No. 10-2012-0057416, filed on May 30, 2012, which is hereby incorporated by reference in its entirety into this application.

BACKGROUND OF THE INVENTION

1. Technical Field

The present invention relates generally to an apparatus and method for processing media in a convergence media service platform and, more particularly, to an apparatus and method for processing media in a convergence media service platform, which provide convergence media into which one or more sensory effects have been inserted based on media and user interaction feedback.

2. Description of the Related Art

A convergence media service is a service that adds one or more sensory effects to conventional media including audio and video and then provides convergence media to a user. That is, a convergence media service is capable of providing one or more sensory effects, such as lighting, a smell, vibrations, and/or the like, to a user while media is being played back. An example of conventional convergence media service-related technology is a technology for creating single ne-media by adding sensory effect metadata to single media, which is disclosed in the paper "Architecture of the SMMD Media Service System," E-ACTIVITES, 2007. Single ne-media is authored in the form of a single file and then stored in a home server. The home server reads the ne-media file, extracts sensory effect metadata, and controls devices for providing sensory effects in synchronization with media, thereby maximizing the sensory effects.

Furthermore, Korean Patent Application Publication No. 10-2008-0016393 (entitled "SMMD-based Ubiquitous Home Media Service Apparatus and Method and Home Media Service System and Method using the Same" and published on Feb. 21, 2008) discloses an SMMD-based ubiquitous home media service apparatus and method, which create media having a new structure (ne-media) that enable device control and synchronization information to be added to existing media, including moving video, audio and text, in order to provide a sensory service. Sensory effect representation information suitable for one's personal preferences and a surrounding device environment is input to the created ne-media and then the ne-media is sent to surrounding devices, so that surrounding devices having a variety of functions can be autonomously converged via the ne-media regardless of the physical location of a user, such as a home, an office or a public area, and provide a sensory media service to the user.

However, the conventional convergence media service-related technologies are problematic in that a separate authoring tool is required to add sensory effects desired by an author to previously created media. That is, in the conventional technologies, an author should author convergence media in which media and sensory effects have been converged by using a separate authoring tool, fetching media, manually adding sensory effects to the media, and directly inputting the attributes of the sensory effects (the types, locations, directions, intensities and values of the sensory effects), so that the conventional convergence media service-related technologies are problematic in that it takes an excessively long time to create convergence media.

Furthermore, in the conventional convergence media service-related technologies, a representation system is used to parse and analyze ne-media created by the authoring tool, perform mapping to one or more devices, create device control instructions, synchronize the devices, and control the devices. Accordingly, the conventional convergence media service-related technologies are problematic in that insufficient sensory effects are provided because only preset sensory effects are provided and thus user interactions cannot be incorporated into the sensory effects.

SUMMARY OF THE INVENTION

Accordingly, the present invention has been made keeping in mind the above problems occurring in the prior art, and an object of the present invention is to provide an apparatus and method for processing media in a convergence media service platform, which provided convergence media that is created by extracting one or more sensory effects based on media, inserting the sensory effects into the media based user interaction feedback information, continuous data and one or more sensors, and editing the sensory effects.

In order to accomplish the above object, the present invention provides an apparatus for creating media in a convergence media service platform, including an media-based sensory effect (MSE) processing unit configured to extract one or more sensory effects from Audio/Video (AV) media; an AV processing unit configured to separate AV media into an audio and a video, and to decode the AV media based on media format; a sensory effect processing unit configured to add the extracted sensory effects in synchronization with a waveform of the separate audio, and to edit attributes of the added sensory effects; and a media creation unit configured to create convergence media by adding the added sensory effects to the AV media.

The MSE processing unit may be configured to create motion effect data by tracking a motion of an object extracted from a media scene, to create lighting effect data by extracting RGB colors for a specific region of the media scene, and to extract the motion effect data and the lighting effect data as the sensory effects.

The apparatus may further include a sensor unit to create sensor-based sensory effect data based on sensing data received from one or more sensors, and the sensory effect processing unit may receive the created sensor-based sensory effect data, add the created sensor-based sensory effect data as sensory effects, and edit attributes of the added sensory effects.

The apparatus may further include a continuous data processing unit configured to create continuous sensory effect data based on the continuous 3D coordinate value motion effect data, created based on the sensing data of the sensor unit, and a sensory effect metadata schema, and the sensory effect processing unit may receive the continuous sensory effect data, add the continuous sensory effect data as sensory effects, and edit attributes of the added sensory effects.

The apparatus may further include an interaction processing unit configured to receive a user interaction event and to create user interaction feedback information; and the sensory effect processing unit may receive the user interaction feedback information, add the user interaction feedback information as sensory effects, and edit attribute of the added sensory effects.

In order to accomplish the above object, the present invention provides an apparatus for representing media in a convergence media service platform, including a convergence media parser unit configured to separate AV data and sensory effect data from each other by parsing convergence media; an AV representation unit configured to represent the separate AV data; a sensory effect representation unit configured to analyze the separate sensory effect data, to perform mapping to one or more target devices, to create control instructions, to control the device based on the control instructions, and to represent sensory effects; and a synchronization unit configured to synchronize AV data playback time received from the AV representation unit with device control time of the sensory effect representation unit.

The apparatus may further include a sensory effect message reception unit configured to receive a sensory effect message from an external interworking program, and the sensory effect representation unit may represent the sensory effects by controlling the devices based on the sensory effects.

The apparatus may further include an interaction processing unit configured to create sensory effect interaction metadata based on the received user interaction event, and the sensory effect representation unit may represent the sensory effects by controlling the devices based on the sensory effect interaction metadata.

The apparatus may further include a continuous data representation unit configured to perform mapping to one or more devices based on continuous sensory effect metadata of the separate sensory effect data, to create control instructions, and to represent continuous sensory effects by controlling the devices based on the control instructions.

In order to accomplish the above object, the present invention provides a method of processing media in a convergence media service platform, including, by a convergence media creation unit, separating AV media into an audio and a video; extracting one or more sensory effects from the AV media; adding the extracted sensory effects in synchronization with the separate audio; decoding the added sensory effects based on format of the AV media; and creating convergence media in which the AV media and the decoded sensory effects have been converged with each other.

The extracting one or more sensory effects may include, by the convergence media creation unit, creating motion effect data by tracking a motion of an object extracted from a media scene; creating lighting effect data by extracting RGB colors for a specific region of the media scene; and extracting the created motion effect data and the lighting effect data as the sensory effects.

The adding one or more sensory effects may include, by the convergence media creation unit, receiving at least one of sensor-based sensory effect data and user interaction feedback information and continuous sensory effect data, and adding the data as the sensory effects; and editing attributes of the added sensory effects.

The adding one or more sensory effects may include, by the convergence media creation unit, creating sensor-based sensory effect data based on sensing data received from one or more sensors.

The adding one or more sensory effects may include, by the convergence media creation unit, creating continuous 3D coordinate value motion effect data based on the sensing data; and creating the continuous sensory effect data based on the created continuous 3D coordinate value motion effect data and a sensory effect metadata schema.

The adding one or more sensory effects may include, by the convergence media creation unit, receiving an user interaction event; and creating user interaction feedback information based on the received user interaction event.

The method may further include, by a convergence media representation unit, separating AV data and sensory effect data by parsing convergence media; representing the separate AV data; analyzing the separate sensory effect data, mapping to one or more target devices, and creating control instructions; synchronizing playback time of the represented AV data with device control time of the created control instructions; and representing the sensory effects by controlling the devices based on the synchronized control instructions.

The method may further include, by the convergence media representation unit, receiving a sensory effect message from an external interworking program; and representing the sensory effects by controlling the devices based on the received sensory effect message.

The method may further include, by the convergence media representation unit, creating sensory effect interaction metadata based on a received user interaction event; and representing the sensory effects by controlling the devices based on the created sensory effect interaction metadata.

The method may further include, by the convergence media representation unit, performing mapping to one or more devices based on the continuous sensory effect metadata of the separate sensory effect data and creating control instructions; and representing continuous sensory effects by controlling the devices based on the created control instructions.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Embodiments of the present invention will be described with reference to the accompanying drawings in order to fully describe the present invention so that persons having ordinary knowledge in the art can easily practice the technical spirit of the present invention. It should be noted that like reference symbols are used to designate like elements throughout the drawings even when the elements are illustrated in different drawings. Furthermore, in the following description of the present invention, detailed descriptions of one or more related well-known constructions and/or one or more functions which have been deemed to make the gist of the present invention unnecessarily vague will be omitted.

Figure 1:
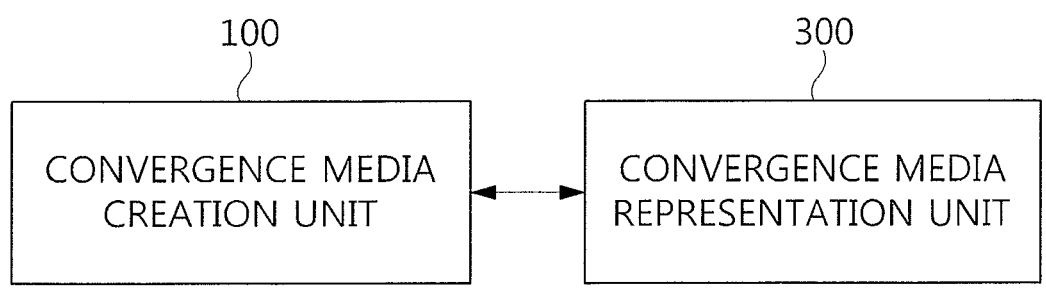
FIG. 1 is a diagram illustrating an apparatus for processing media in a convergence media service platform according to an embodiment of the present invention.

An apparatus for processing media in a convergence media service platform according to an embodiment of the present invention will be described in detail with reference to the accompanying drawings. FIG. 1 is a diagram illustrating the apparatus for processing media in a convergence media service platform according to the embodiment of the present invention.

As shown in FIG. 1, the apparatus for processing media in a convergence media service platform includes a convergence media creation unit 100 for creating convergence media in which media has been incorporated with sensory effects, and a convergence media representation unit 300 for representing the convergence media created by the convergence media creation unit 100. Here, the convergence media creation unit 100 corresponds to an apparatus for creating media in a convergence media service platform that is set forth in claims of the present invention, and the convergence media representation unit 300 corresponds to an apparatus for representing media in a convergence media service platform.

The convergence media creation unit 100 loads existing audio/video (AV) media, decodes the AV media in accordance with a media format, and plays back the AV media via a player. The convergence media creation unit 100 extracts an audio signal from the AV media, adds sensory effects in synchronization with the audio signal, edits the attributes of the sensory effects, receives and edits sensor-based sensory effect data, receives and edits user interaction feedback information, and receives and edits continuous data. The convergence media creation unit 100 receives sensing data from a sensor, and creates motion effect data based on a reference value. The convergence media creation unit 100 processes continuous data that is represented by continuous 3D coordinate values. The convergence media creation unit 100 receives a user interaction event, and creates interaction feedback information. The convergence media creation unit 100 automatically extracts one or more sensory effects based on media. The convergence media creation unit 100 creates convergence media by adding the sensory effects to the media. The convergence media creation unit 100 creates convergence media by combining sensor-based sensory effect data, received from a sensor unit (which will be describe later), with the video from a video camera. The convergence media creation unit 100 stores the created convergence media or sends the created convergence media to an external server.

The convergence media representation unit 300 separates the AV media and the sensory effect data by parsing the convergence media created by the convergence media creation unit 100. The convergence media representation unit 300 represents the obtained AV media. The convergence media representation unit 300 synchronizes the playback period of the AV media with the control of one or more devices. The convergence media representation unit 300, in order to provide the sensory effects using one or more devices, analyzes the obtained sensory effect data, performs mapping to one or more target devices and controls the target devices, controls a device based on a sensory effect message received from the outside, and controls the device based on a user interaction event. The convergence media representation unit 300 controls a device, such as a 3D motion chair, based on continuous data such as coordinate data. The convergence media representation unit 300 receives a user interaction event, and creates sensory effect interaction metadata information. The convergence media representation unit 300 sends a sensory effect message and receives a sensory effect message from the external interworking program, via an external interworking program.

Figure 2:
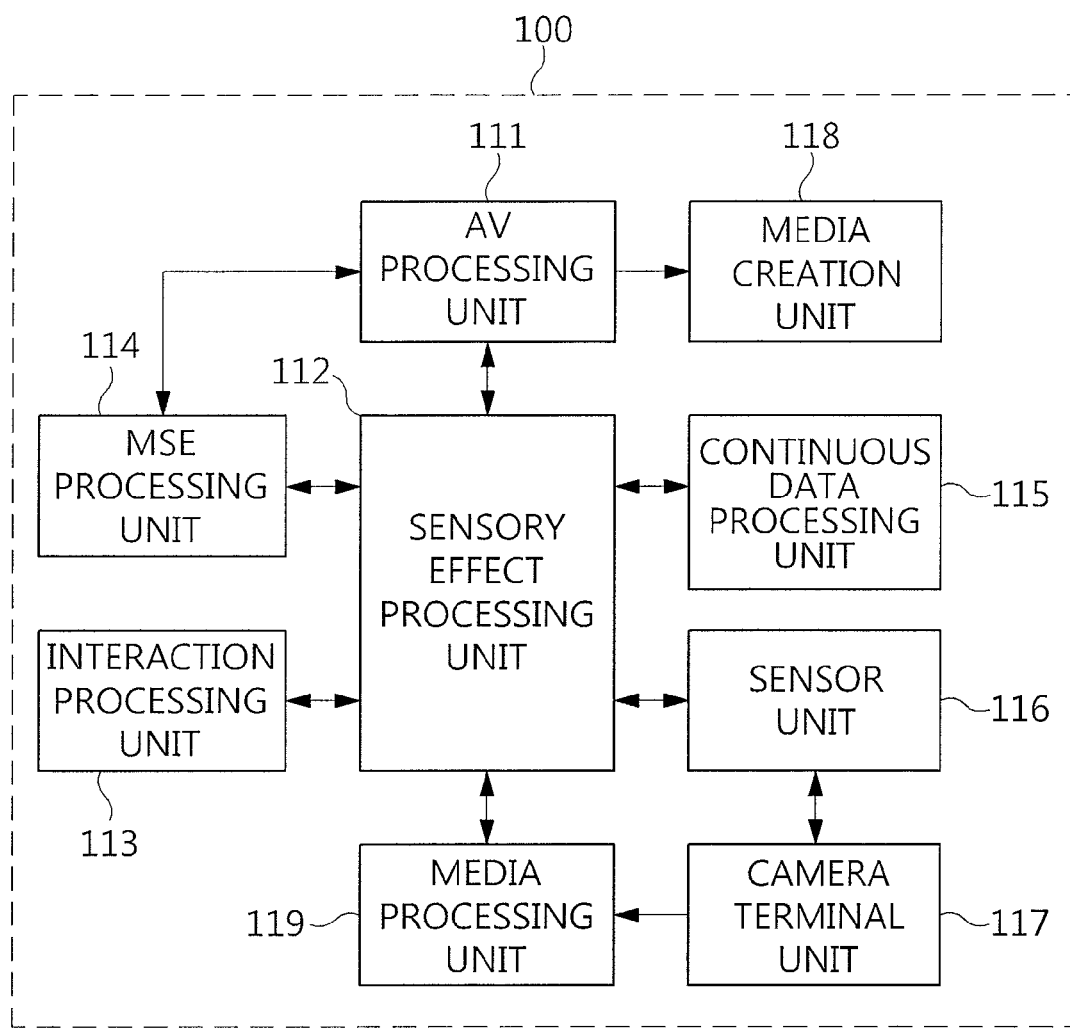
FIGS. 2 and 3 are diagrams illustrating the convergence media creation unit of the apparatus for processing media in a convergence media service platform according to the embodiment of the present invention.
Figure 3:
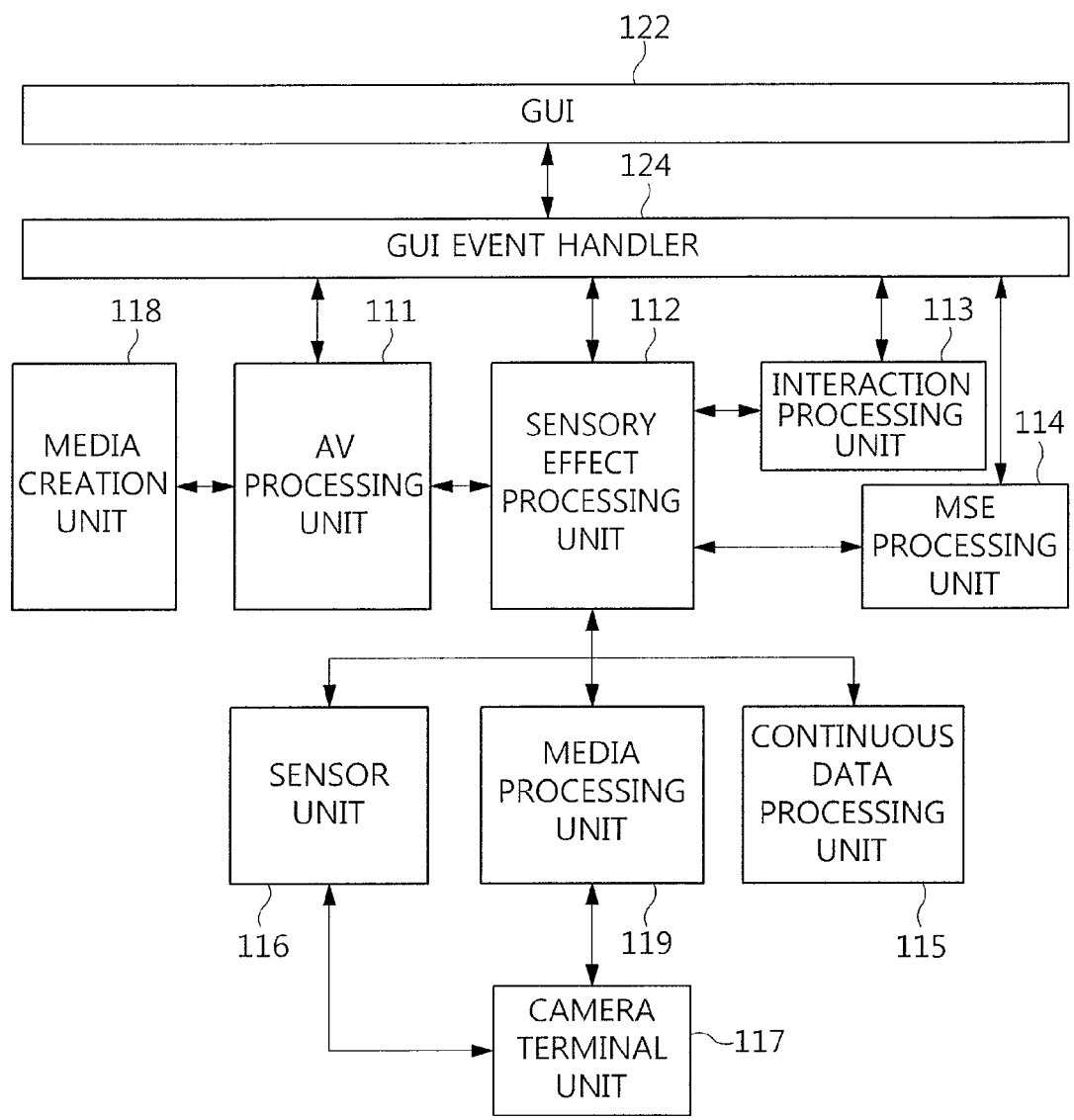
Figure 4:
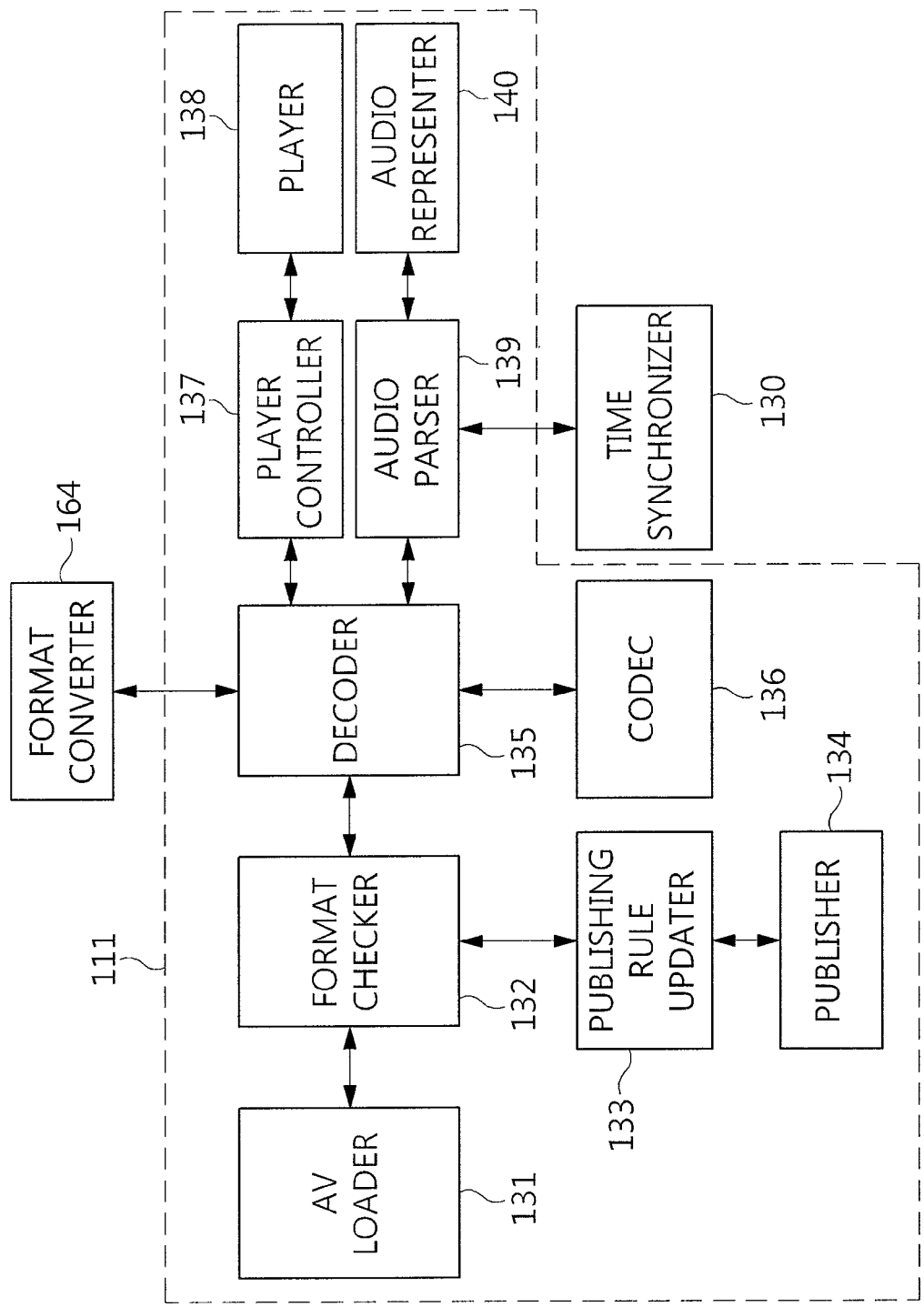
FIG. 4 is a diagram illustrating the AV processing unit of FIG. 2.
Figure 5:
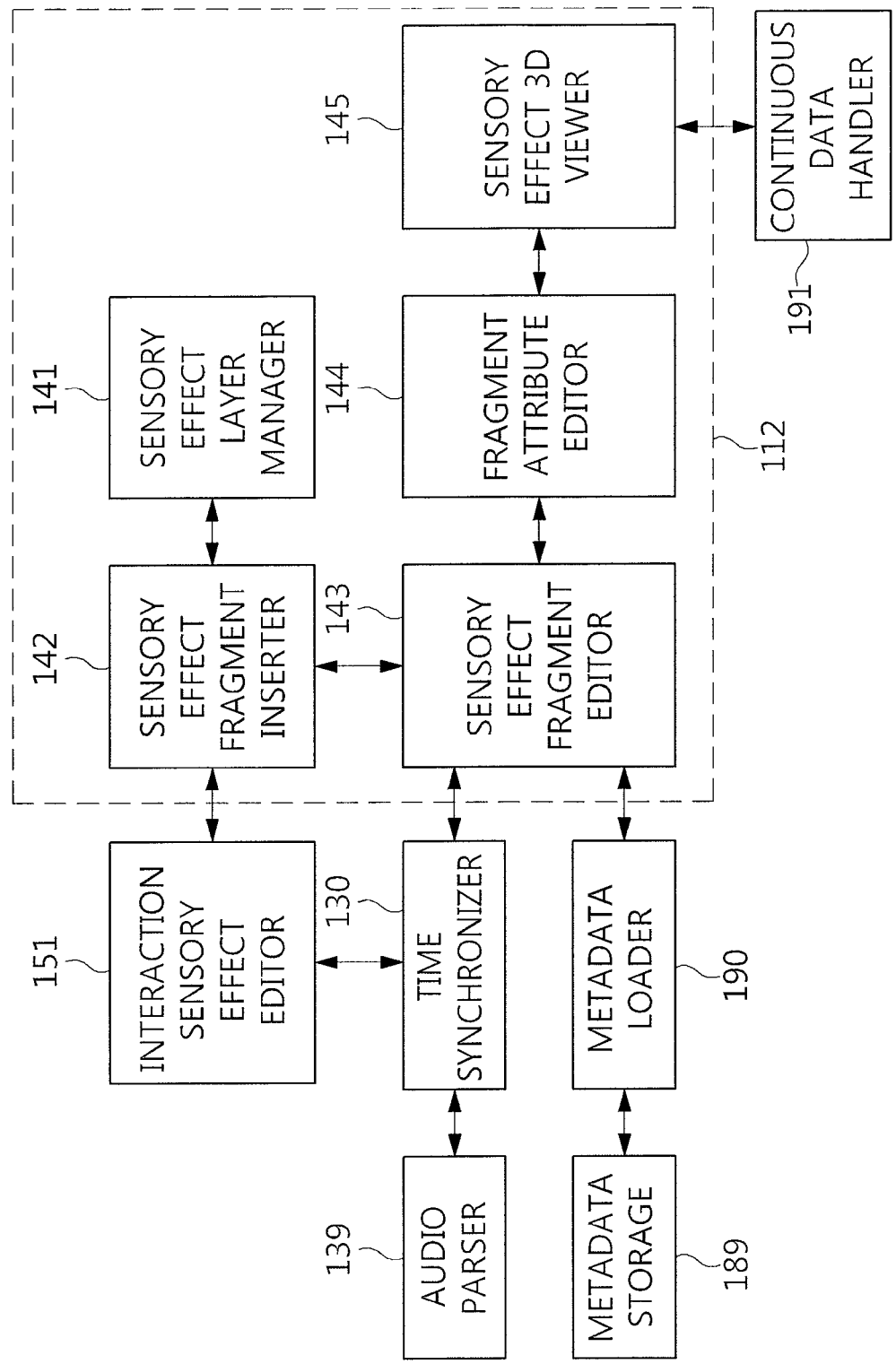
FIG. 5 is a diagram illustrating the sensory effect processing unit of FIG. 2.
Figure 6:
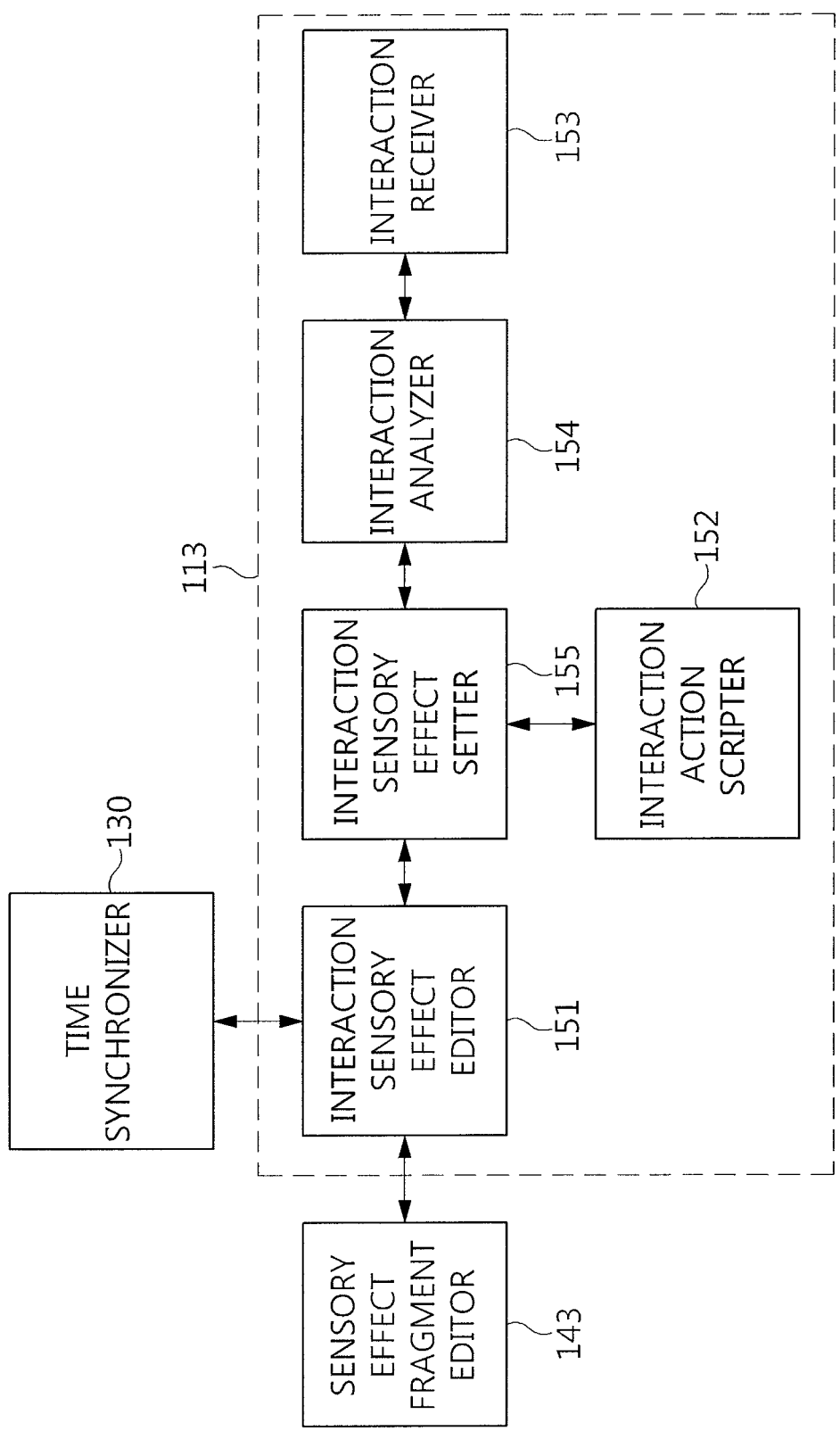
FIG. 6 is a diagram illustrating the interaction processing unit of FIG. 2.
Figure 7:
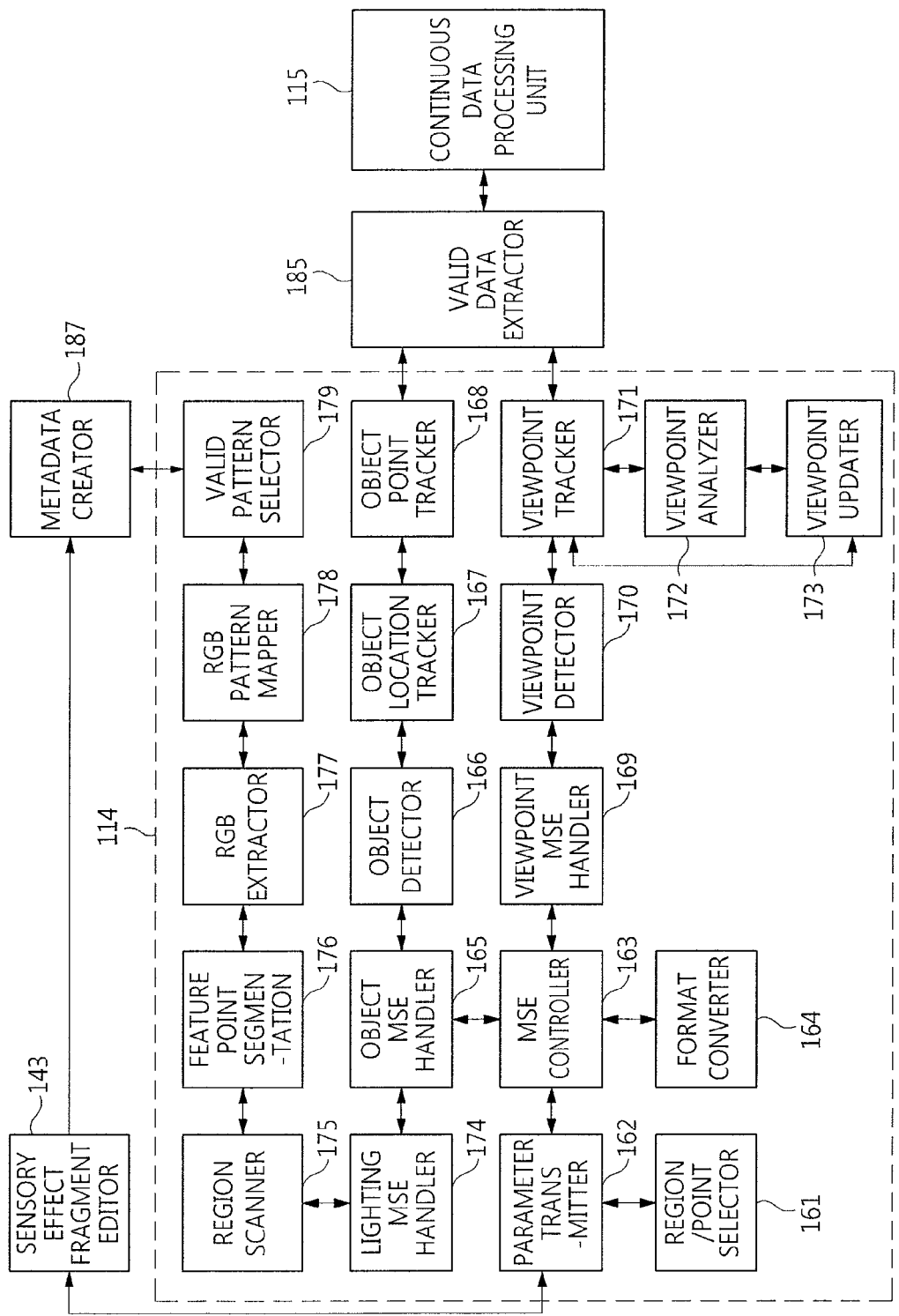
FIG. 7 is a diagram illustrating the MSE processing unit of FIG. 2.
Figure 8:
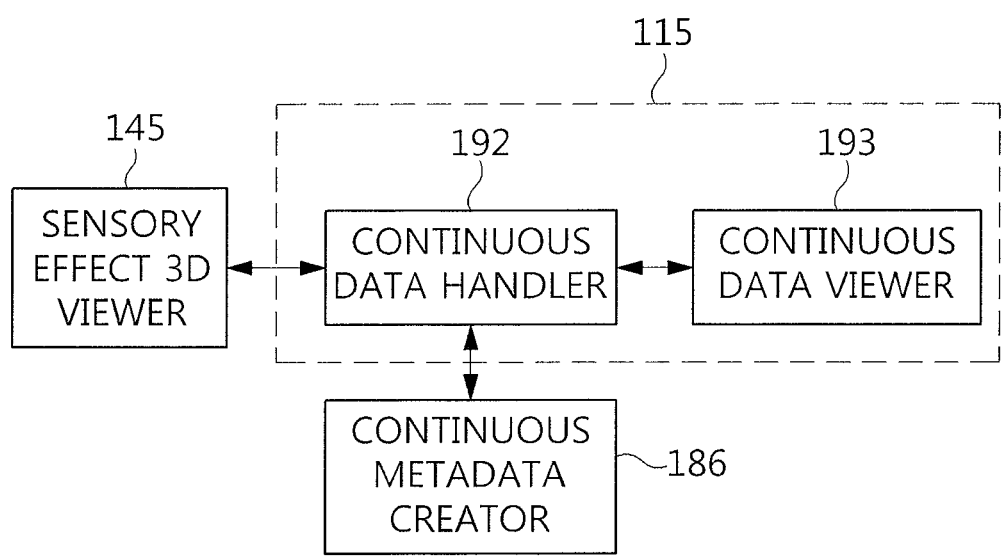
FIG. 8 is a diagram illustrating the continuous data processing unit of FIG. 2.
Figure 9:
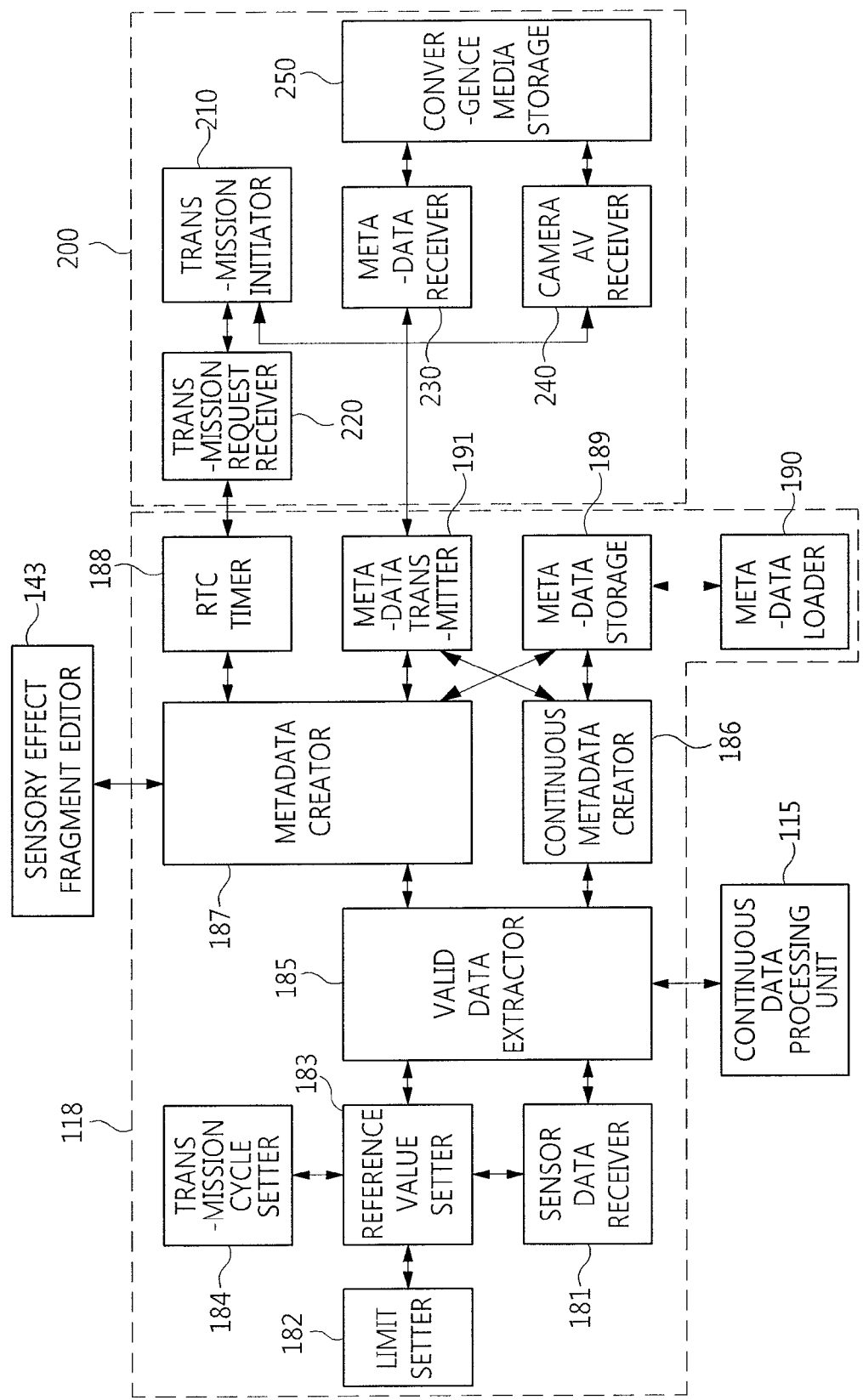
FIG. 9 is a diagram illustrating the media creation unit of FIG. 2.

The convergence media creation unit of the apparatus for processing media in a convergence media service platform according to the embodiment of the present invention will now be described in detail with reference to the accompanying drawings. FIGS. 2 and 3 are diagrams illustrating the convergence media creation unit of the apparatus for processing media in a convergence media service platform according to the embodiment of the present invention. FIG. 4 is a diagram illustrating the AV processing unit of FIG. 2. FIG. 5 is a diagram illustrating the sensory effect processing unit of FIG. 2. FIG. 6 is a diagram illustrating the interaction processing unit of FIG. 2. FIG. 7 is a diagram illustrating the MSE processing unit of FIG. 2. FIG. 8 is a diagram illustrating the continuous data processing unit of FIG. 2. FIG. 9 is a diagram illustrating the media creation unit of FIG. 2.

As shown in FIG. 2, the convergence media creation unit 100 includes an AV processing unit 111, a sensory effect processing unit 112, an interaction processing unit 113, an MSE (media-based sensory effect) processing unit 114, a continuous data processing unit 115, a sensor unit 116, a camera terminal unit 117, a media creation unit 118, and a media processing unit 119. Here, as shown in FIG. 3, the convergence media creation unit 100 may further include a graphic user interface (GUI) 122 for enabling a user to create convergence media and a user interface event handler (GUI event handler) 124 for enabling a user to process a sensory effect event.

The AV processing unit 111 loads existing media, and checks the format of media. If the media format is the MPEG-4 format, the AV processing unit 111 creates single media in which sensory effects have been combined with the media by inserting the sensory effects into the track of the media. In contrast, if the media format is not the MPEG-4 format, the AV processing unit 111 creates the sensory effects as a separate file. It is apparent that if the media format is not the MPEG-4 format, the AV processing unit 111 may create the sensory effects as a separate file. That is, the AV processing unit 111 creates the media separately in MPEG-4 format and in the sensory effect file.

The AV processing unit 111 separates audio and video from the media. The AV processing unit 111 displays the waveform of the separate audio on a screen. This enables the AV processing unit 111 to allow the user to set a location at which sensory effects will be inserted and time synchronization.

The AV processing unit 111 plays back the separate video via the player 138. This enables the AV processing unit 111 to allow the user to simulate the representation of a video to be played back and the sensory effects additionally edited on the screen.

For this purpose, as shown in FIG. 4, the AV processing unit 111 includes an AV loader 131, a format checker 132, a publishing rule updater 133, a publisher 134, a decoder 135, a play controller 137, a player 138, an audio parser 139, and an audio representer 140.

The AV loader 131 fetches existing media. That is, The AV loader 131 loads media including no sensory effects.

The format checker 132 analyzes the format of the media loaded by the AV loader 131. If the format of the media format is the MPEG-4 format, single convergence media may be created by including sensory effect data in the track of the media when convergence media is published, or sensory effect data may be created as a separate file. In contrast, if the format of the media format is the MPEG-4 format, sensory effect data can be created only as a separate file.

The publishing rule updater 133 updates publishing rules with the results of the analysis performed by the format checker 132, and stores the updated publishing rules. The publishing rule updater 133 sends the stored publishing rules to the publisher 134.

The publisher 134 publishes the convergence media according to the publishing rule from the publishing rule updater 133.

The decoder 135 decodes the media using the codec 136 suitable for the media format. The decoder 135 decodes video and audio included in the media.

The play controller 137 performs the playback control of the decoded video such as playing, pausing and fast playing.

The player 138 plays back the decoded video under the control of the play controller 137.

The audio parser 139 extracts the waveform of the decoded audio.

The audio representer 140 displays the waveform of the audio, extracted by the audio parser 139, on the screen.

The time synchronizer 130 synchronizes the waveform of the audio, extracted by the audio parser 139, with the media sensory effects.

The sensory effect processing unit 112 creates a layer for the types of sensory effects by inserting the sensory effects defined as icon types, using the waveform of the audio, obtained by the AV processing unit 111, on a temporal basis.

The sensory effect processing unit 112 adds a sensory effect fragment to the created layer. The sensory effect processing unit 112 sets the length of the added sensory effect fragment as the representation time of the sensory effects. The sensory effect processing unit 112 may input the attributes of the sensory effect fragment. Here, the sensory effect processing unit 112 inputs the attributes of the sensory effects, including the type, location, direction, size, intensity, and value of the sensory effects.

The sensory effect processing unit 112 receives sensory effect data from the MSE processing unit 114. That is, when sensory effect automatic extraction functionality is activated by the user interface, the sensory effect processing unit 112 receives automatically extracted sensory effect data from the MSE processing unit 114.

The sensory effect processing unit 112 receives a user interaction event from the interaction processing unit 113. The sensory effect processing unit 112 adds and edits the created sensory effects based on the received user interaction event.

The sensory effect processing unit 112 receives continuous data sensory effects from the continuous data processing unit 115, and adds the received continuous data sensory effects to the media and edits the received continuous data sensory effects. That is, the sensory effect processing unit 112 continuously receives motion data from a device, such as a joy stick, receives the continuous data sensory effects created by the continuous data processing unit 115, and performs adding and editing.

The sensory effect processing unit 112 receives the sensor-based continuous data sensory effects created by the sensor unit 116, and adds and edits the sensor-based continuous data sensory effects based on the data sensed by the acceleration, angular velocity and gyro sensors.

The sensory effect processing unit 112 sends the continuous data sensory effects to the continuous data processing unit 115. The sensory effect processing unit 112 also receives the results of the processing of the continuous data sensory effects from the continuous data processing unit 115, and performs representation.

For this purpose, as shown in FIG. 5, the sensory effect processing unit 112 includes a sensory effect layer manager 141, a sensory effect fragment inserter 142, a sensory effect fragment editor 143, a fragment attribute editor 144, and a sensory effect 3D viewer 145.

The sensory effect layer manager 141 adds a sensory effect layer for sensory effects corresponding to a sensory effects icon click event that is generated by the GUI event handler 124.

The sensory effect fragment inserter 142 adds a sensory effect fragment to the sensory effect layer. Here, the length of the fragment represents the representation time of the sensory effects.

The sensory effect fragment editor 143 edits the added sensory effect fragment.

The fragment attribute editor 144 edits the attributes of sensory effects for the selected fragment. Here, the fragment attribute editor 144 edits the attributes of the sensory effects, including the type, location, direction, intensity, level, and value of the sensory effects. Here, in the case of a motion effect that is one of the sensory effects, the fragment attribute editor 144 constructs a 4D chair in three dimensions so that a user can input the effect by intuition.

The sensory effect 3D viewer 145 enables a user to input the motion of the 4D chair, constructed in three dimensions, in 3D space by intuition. Furthermore, the sensory effect 3D viewer 145 is connected to a device, such as a joy stick, so that the 4D chair constructed in three dimensions is moved by the motion of the joy stick, thereby enabling a user to input a motion effect more easily.

The interaction processing unit 113 analyzes a user interaction event that is generated via an interface such as a camera, a sensor, or voice. The interaction processing unit 113 adds or edits corresponding sensory effects based on the analyzed user interaction event. For this purpose, as shown in FIG. 6, the interaction processing unit 113 includes an interaction sensory effect editor 151, an interaction action scripter 152, an interaction receiver 153, an interaction analyzer 154, and an interaction sensory effect setter 155.

The interaction sensory effect editor 151 creates a sensory effect fragment that can process one or more user interaction events during the entire time of the media or at one or more specific times of the media, and edits the effect representation time.

The interaction action scripter 152 defines actions based on user interaction events.

The interaction receiver 153 creates an interaction sensory effect fragment, and receives interaction information that is input by a user via a camera motion, a sensor, or voice.

The interaction analyzer 154 creates a user interaction event using the information received by the interaction receiver 153. The interaction analyzer 154 creates an action based on the created user interaction event.

The interaction sensory effect setter 155 defines user interaction events. The interaction sensory effect setter 155 sets the action, defined by the interaction action scripter 152, as the sensory effects. It is apparent that the interaction sensory effect setter 155 may define interactive sensory effect events and actions via the camera motion, sensor or voice of a user.

The interaction sensory effect setter 155 creates a created event and action as user interaction sensory effect data. Here, the interaction sensory effect setter 155 may automatically extract sensory effects based on the media and add and edit the sensory effect data. The interaction sensory effect setter 155 may create a fragment for a user motion or a lighting effect, designate a specific region of media, and extract a media-based sensory effect automatic extraction algorithm.

The MSE processing unit 114 automatically extracts sensory effects from a media scene, and creates sensory effect data. The MSE processing unit 114 extracts an object from the media scene. The MSE processing unit 114 creates motion effect data by tracking the motion of the extracted object. The MSE processing unit 114 creates motion effect data for the motion of a media scene based on the camera viewpoint of the media scene. The MSE processing unit 114 extracts RGB colors for a specific region of the media scene and creates lighting effect data. For this purpose, as shown in FIG. 7, the MSE processing unit 114 includes a region/point selector 161, a parameter transmitter 162, an MSE controller 163, a format converter 164, an object MSE handler 165, an object detector 166, an object location tracker 167, an object point tracker 168, a viewpoint MSE handler 169, a viewpoint detector 170, a viewpoint tracker 171, a viewpoint analyzer 172, a viewpoint updater 173, a lighting MSE handler 174, a region scanner 175, feature point segmentation 176, an RGB extractor 177, an RGB pattern mapper 178, and a valid pattern selector 179.

The region/point selector 161 selects a specific region and point from the media scene.

The parameter transmitter 162 receives attribute information (information about the type of an effect, object-based information, and viewpoint-based information) about a sensory effect fragment from the sensory effect fragment editor 143. The parameter transmitter 162 receives information about the region and the point from the region/point selector 161 and provides the information to the MSE controller 163.

The MSE controller 163 determines an algorithm to be invoked based on the information received from the parameter transmitter 162. The MSE controller 163 converts the format of the media received from the decoder 135 into the YUV or PG file format suitable for an automatic extraction algorithm and transfers the media in the resulting format to the corresponding algorithm.

The format converter 164 is loaded by the AV loader 131, and converts the format of the media decoded by the decoder 135 into the YUV or JPG format that can be used in the automatic extraction algorithm.

The object MSE handler 165 sets the region limited by the region/point selector 161 as an automatic extraction target image.

The object detector 166 detects an object, that is, the target of a motion, within the limited region.

The object location tracker 167 tracks the movement of the detected object between locations.

The object point tracker 168 tracks the 3D motion of the detected object, and tracks the forward/backward motion of the object.

The viewpoint MSE handler 169 sets a change in the camera viewpoint with respect to the media scene based on the region or point limited by the region/point selector 161.

The viewpoint detector 170 detects a set number of viewpoints within the region and a set number of viewpoints within the overall scene in each media scene with respect to the limited region or point.

The viewpoint tracker 171 tracks the viewpoints detected by the viewpoint detector 170 in each media scene. Here, the viewpoint tracker 171 sends variations in the tracked viewpoints to a valid data extractor (which will be described later). The viewpoint tracker 171 receives variations in the tracked viewpoints from which unnecessary data and jitters have been eliminated by low-pass filtering from the valid data extractor. The viewpoint tracker 171 continuously tracks a viewpoint from the time at which a new viewpoint is detected in a media scene to the time at which the viewpoint disappears.

The viewpoint analyzer 172 sets a limit based on the disappearance of a viewpoint, a large change, the detection of a new viewpoint, etc. and creates a new viewpoint when the limit is exceeded.

The viewpoint updater 173 makes an update with information about the new viewpoint created by the viewpoint analyzer 172, and provides the information to the viewpoint tracker 171.

The lighting MSE handler 174 creates the region limited by the region/viewpoint selector as a lighting effect automatic extraction target image.

The region scanner 175 scans the lighting effect automatic extraction target image created by the lighting MSE handler 174, and sets feature points.

The feature point segmentation 176 performs segmentation into small regions based on the feature points by connecting the feature points set by the region scanner 175. The feature point segmentation 176 classifies the segment regions into valid and invalid regions.

The RGB extractor 177 computes the RGB values of respective pixels within each segment region. The RGB extractor 177 sets groups of RGB values as representative primary colors, maps the RGB values to the representative primary colors, and computes RGB values with a weight given to a frequent representative primary color. The RGB extractor 177 computes representative RGB values for respective segment regions using the computed RGB values.

The RGB pattern mapper 178 performs mapping to RGB patterns that can be represented using a Light-Emitting Diode (LED) lighting device, based on the representative RGB values computed for the respective segment regions.

The valid pattern selector 179 selects a pattern having the widest region and the highest similarity from among the RGB patterns mapped for the respective segment regions by the RGB pattern mapper 178.

The continuous data processing unit 115 displays continuous data received from a joy stick and continuous data received from a sensor via a 3D viewer, and creates sensory effect data based on continuous 3D coordinate values differently from the other sensory effect data.

For this purpose, as shown in FIG. 8, the continuous data processing unit 115 includes a continuous data handler 192, a continuous data viewer 193, and a continuous metadata creator 186.

The continuous data handler 192 converts motion data received from the joy stick into 3D coordinate values specified for the x, y and z axes. The continuous data handler 192 creates continuous data for a motion effect using the obtained 3D coordinate values.

The continuous data handler 192 creates the 3D coordinate value motion effect data, created based on the data detected by acceleration, angular velocity and gyro sensors, as continuous data.

The continuous data viewer 193 represents continuous motion effect data on the screen using the 3D coordinate values created by the continuous data handler 192.

The continuous metadata creator 186 creates the continuous 3D coordinate value sensory effect data in conformity with the sensory effect metadata schema that was standardized in MPEG-V. Here, the sensory effect data created by the continuous metadata creator 186 is a type of sensory effect, and includes a user interaction.

The sensor unit 116 creates continuous 3D coordinate values based on sensing data received from the acceleration, angular velocity and gyro sensors, and provides the continuous 3D coordinate values to the sensory effect processing unit 112.

The camera terminal unit 117 receives sensory effect data for the continuous 3D coordinate values created by the sensor unit 116. The camera terminal unit 117 receives a video from an internal camera, and creates convergence media in which the video and sensory effects are combined with each other.

The media creation unit 118 creates single convergence media by combining media with sensory effects according to the media format determined by the AV processing unit 111 and user settings. It is apparent that the media creation unit 118 may creates sensory effects as a file separate from that of the media. For this purpose, as shown in FIG. 9, the media creation unit 118 includes a sensor data receiver 181, a limit setter 182, a reference value setter 183, a transmission cycle setter 184, a valid data extractor 185, a continuous metadata creator 186, a metadata creator 187, an RTC timer 188, a metadata storage 189, and a metadata transmitter 191.

The sensor data receiver 181 receives sensing data from the acceleration, angular velocity and gyro sensors.

The limit setter 182 sets a limit value that is used to recognize valid data based on variations in the sensor value.

The reference value setter 183 sets a reference value indicative of the stationary state of the motion chair by monitoring the sensed data received by the sensor data receiver 181 for a predetermined period. The reference value setter 183 updates the reference value if values higher than the limit value are detected for a predetermined period while performing the monitoring.

The transmission cycle setter 184 sets the creation cycle of the sensory effect data. That is, the transmission cycle setter 184 sets a cycle in which sensed data is created as sensory effect data.

The valid data extractor 185 extracts valid data by eliminating unnecessary data and jitters from sensed data. That is, the valid data extractor 185 eliminates unnecessary data and jitters by performing low-pass filtering on sensed data based on the reference value. The valid data extractor 185 sends the valid data from which the unnecessary data and jitters have been eliminated to the continuous metadata creator 186 or metadata creator 187. Here, the valid data extractor 185 sends the extracted valid data to the continuous metadata creator 186 if the extracted valid data is valid data that corresponds to a motion effect. The valid data extractor 185 sends the extracted valid data to the metadata creator 187 if the extracted valid data is valid data that corresponds to a lighting effect.

The continuous metadata creator 186 receives sensing data from the acceleration, angular velocity and gyro sensors, and creates metadata as 3D coordinate values specified for the x, y and z axes.

The continuous metadata creator 186 continuously stores and sends sensed data. Here, the continuous metadata creator 186 continuously stores and sends the sensed data in a transmission cycle.

The metadata creator 187 receives sensing data from a lighting sensor, and creates metadata about RGB values. Here, the sensory effects may be created based on sensing data from the acceleration, angular velocity and gyro sensors.

The metadata creator 187 converts the automatically extracted lighting effect data into sensory effect metadata format that was standardized in MPEG-V. The metadata creator 187 sends the converted sensory effect metadata to the sensory effect fragment editor 143. Accordingly, the sensory effect fragment editor 143 represents the corresponding sensory effect metadata on the screen.

The metadata creator 187 performs synchronization using the time at which the media processing unit 119 makes a request for transmission and the time which is given by the RTC timer 188.

The RTC timer 188 synchronizes discontinuous (that is, pattern-based sensory effect metadata) by inserting information about absolute time.

The metadata storage 189 continuously or discontinuously stores the created metadata. That is, the metadata storage 189 continuously or discontinuously stores the created metadata in internal memory/a hard disk drive (HDD) in conformity with the MPEG-V standardization schema.

The metadata transmitter 191 continuously or discontinuously sends the created metadata to the outside. Here, the metadata transmitter 191 continuously or discontinuously sends the created metadata to the outside in metadata transmission units. Here, an external terminal 200 equipped with an internal camera may receive sensory effect metadata from the metadata transmitter 191.

Here, as shown in FIG. 9, the external terminal 200 includes a transmission initiator 210, a transmission request receiver 220, a metadata receiver 230, a camera AV receiver 240, and convergence media storage 250.

The transmission initiator 210 sends a message directing the transmission of metadata to be initiated in order to receive sensory effect metadata. Here, the transmission initiator 210 sends the message with the internal time of the external terminal 200 attached thereto. Additionally, the transmission initiator 210 requests the camera AV receiver 240 to receive video information at the time at which transmission is initiated.

The transmission request receiver 220 receives a sensory effect metadata transmission initiation request message, and hands over the time at which the initiation of transmission was requested to the RTC timer 188.

The metadata receiver 230 receives the sensory effect metadata from the metadata transmitter 191.

The camera AV receiver 240 receives a video from an internal camera, and provides the video to the convergence media storage 250.

The convergence media storage 250 creates convergence media by combining the video received from the camera AV receiver 240 and the sensory effect metadata received from the metadata receiver 230, and stores the convergence media in the internal memory/HDD.

The media processing unit 119 stores the convergence media created by the camera terminal unit 117 or sends the convergence media to the external server.

Figure 10:
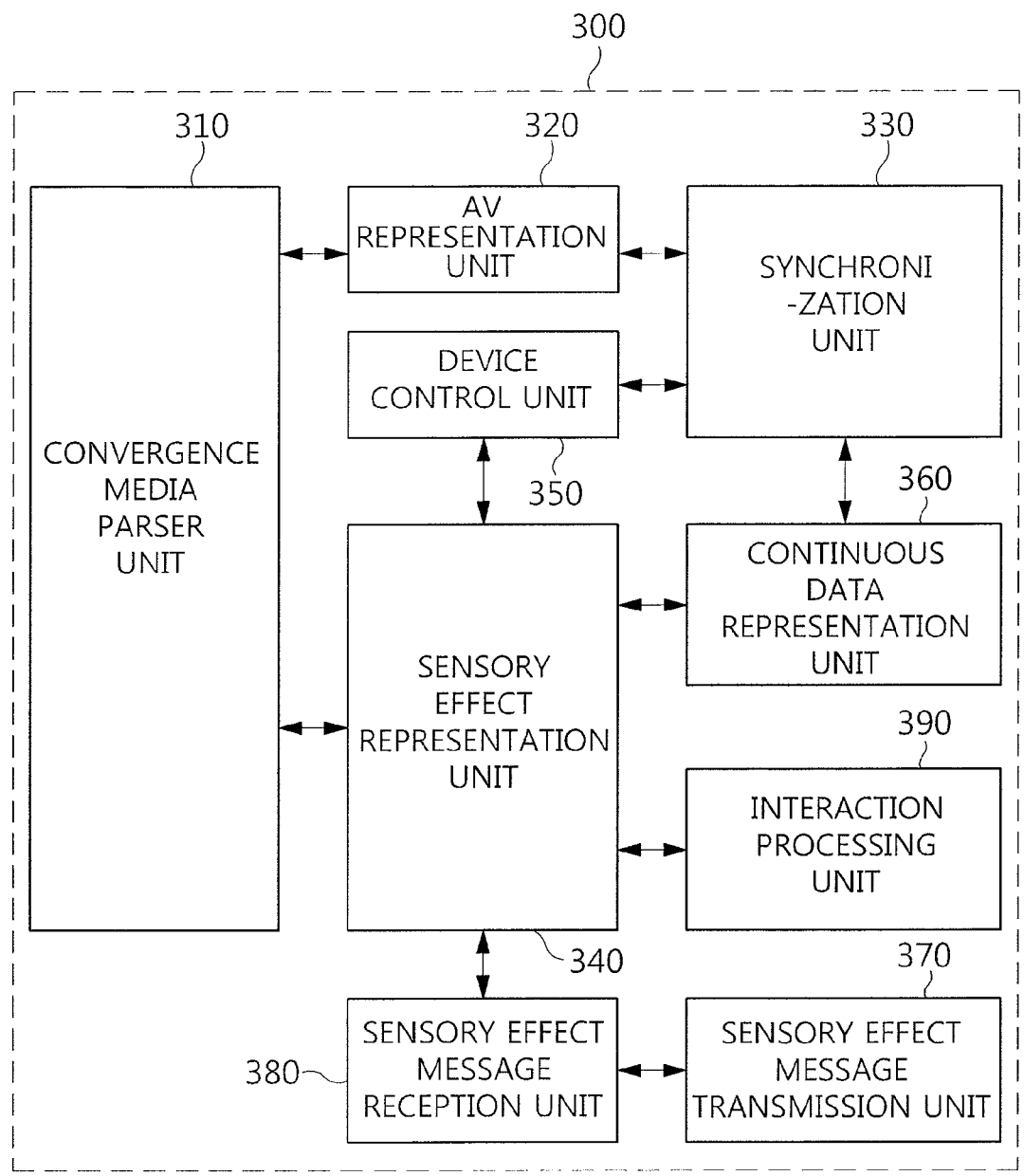
FIG. 10 is a drawing illustrating the convergence media representation unit of FIG. 1.
Figure 11:
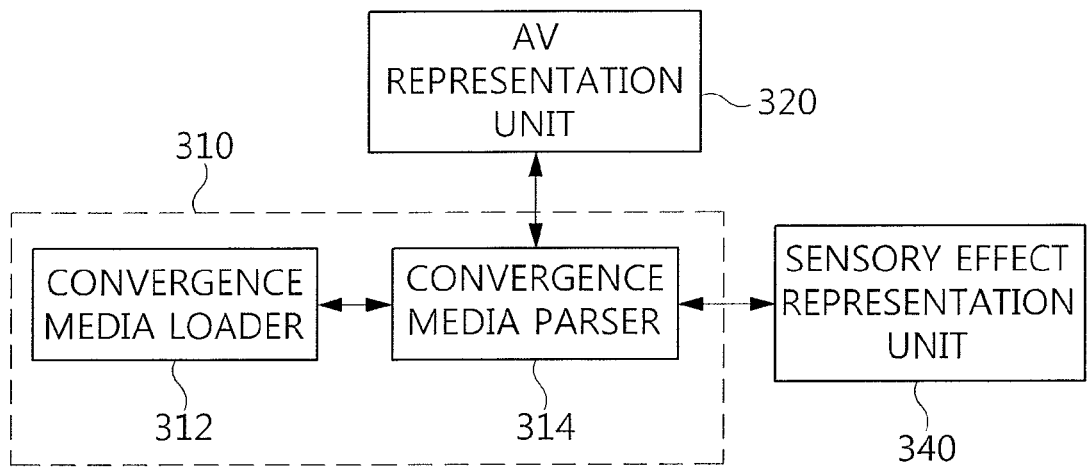
FIG. 11 is a drawing illustrating the convergence media parser unit of FIG. 10.
Figure 12:
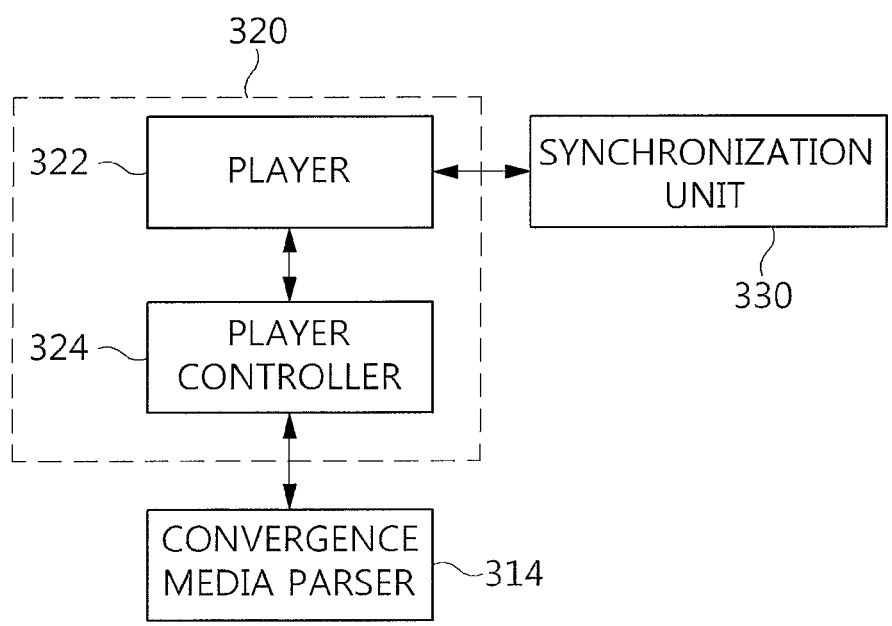
FIG. 12 is a drawing illustrating the AV representation unit of FIG. 10.
Figure 13:
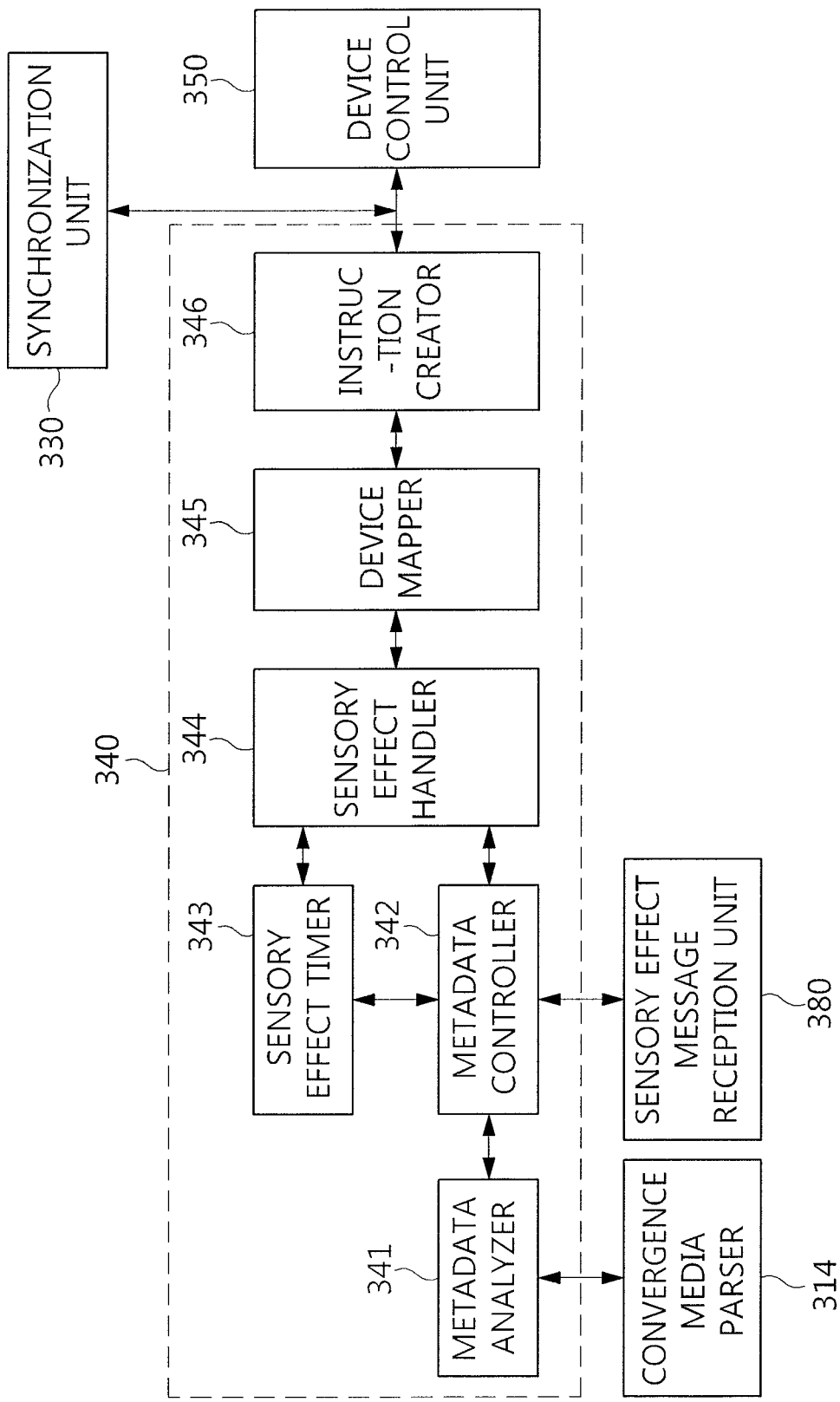
FIG. 13 is a drawing illustrating the sensory effect representation unit of FIG. 10.
Figure 14:
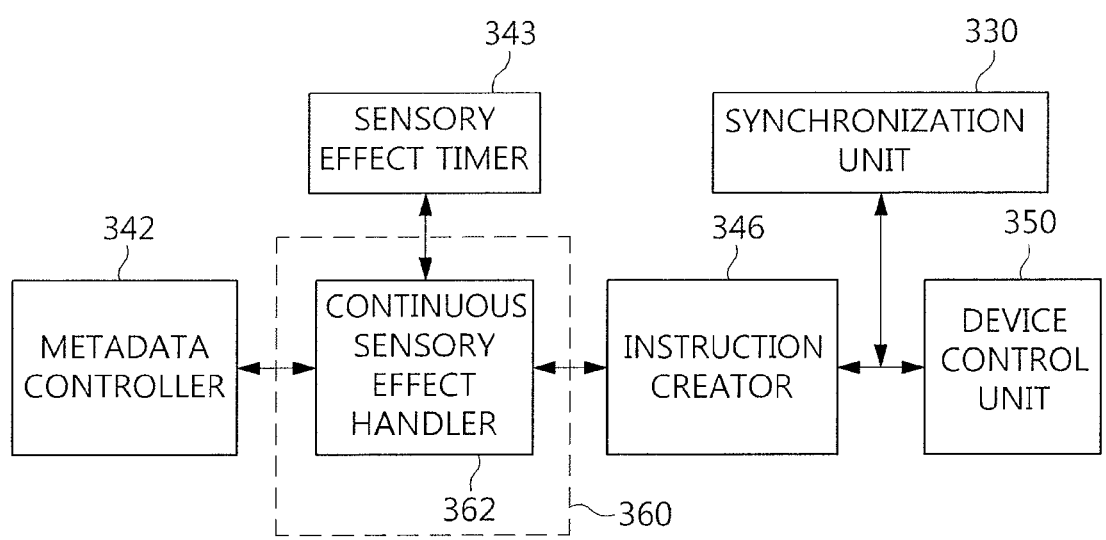
FIG. 14 is a drawing illustrating the continuous data representation unit of FIG. 10.
Figure 15:
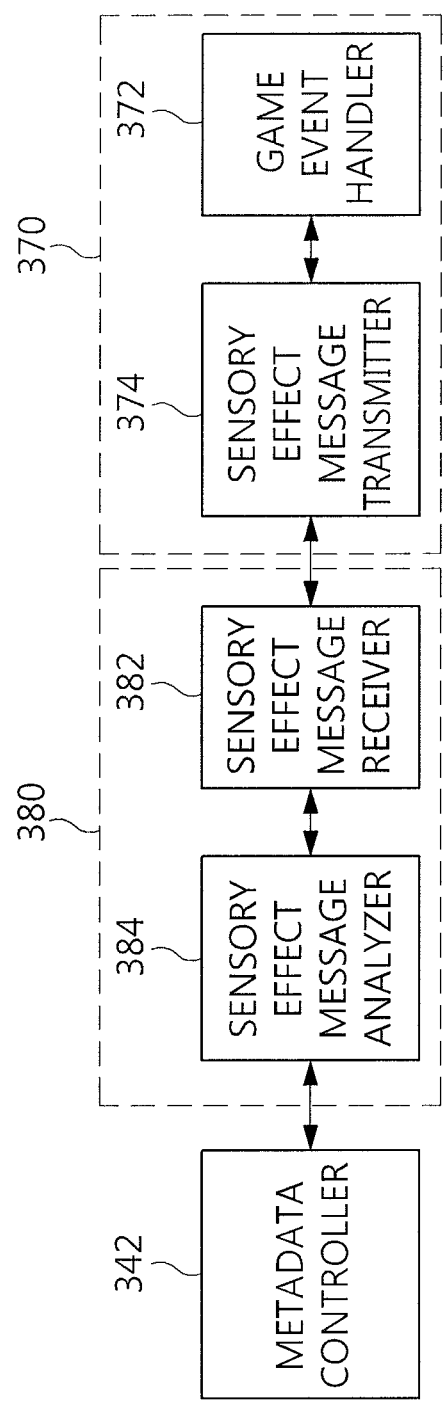
FIG. 15 is a drawing illustrating the sensory effect message transmission unit and sensory effect message reception unit of FIG. 10.
Figure 16:
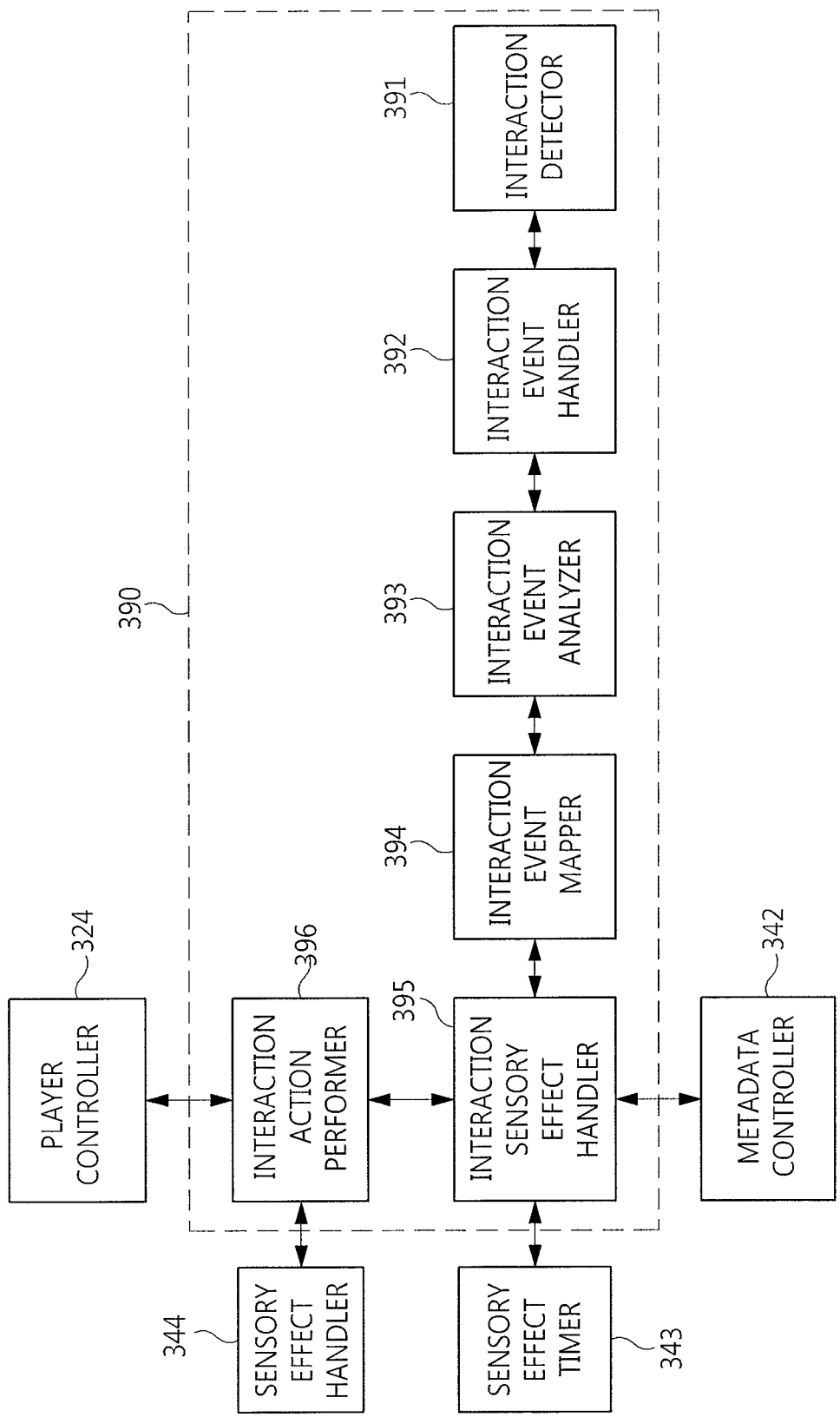
FIG. 16 is a drawing illustrating the interaction processing unit of FIG. 10.

The convergence media representation unit 300 of the apparatus for processing media in a convergence media service platform according to the embodiment of the present invention will be described in detail below with reference to the accompanying drawings. FIG. 10 is a drawing illustrating the convergence media representation unit of FIG. 1. FIG. 11 is a drawing illustrating the convergence media parser unit of FIG. 10. FIG. 12 is a drawing illustrating the AV representation unit of FIG. 10. FIG. 13 is a drawing illustrating the sensory effect representation unit of FIG. 10. FIG. 14 is a drawing illustrating the continuous data representation unit of FIG. 10. FIG. 15 is a drawing illustrating the sensory effect message transmission unit and sensory effect message reception unit of FIG. 10. FIG. 16 is a drawing illustrating the interaction processing unit of FIG. 10.

As shown in FIG. 10, the convergence media representation unit 300 includes a convergence media parser unit 310, an AV representation unit 320, a synchronization unit 330, a sensory effect representation unit 340, a device control unit 350, a continuous data representation unit 360, a sensory effect message transmission unit 370, a sensory effect message reception unit 380, and an interaction processing unit 390.

The convergence media parser unit 310 separates AV media and sensory effect data by parsing convergence media created by the convergence media creation unit 100. For this purpose, as shown in FIG. 11, the convergence media parser unit 310 includes a convergence media loader 312 for loading convergence media created by the media creation unit 118 and a convergence media parser 314 for separating the loaded convergence media into AV media and sensory effect data. The convergence media parser 314 sends the separate AV media to the AV representation unit 320, and sends the separate sensory effect data to the sensory effect representation unit 340.

The AV representation unit 320 plays back the AV media obtained by the convergence media parser unit 310. For this purpose, as shown in FIG. 12, the AV representation unit 320 includes a player controller 324 for controlling the playback of the separate AV media and a player 322 for playing back the separate AV media under the control of the player controller 324. Here, the player controller 324 performs media playback control such as stopping, pausing, playing, and fast playing. The player 322 plays back the AV media and also sends playback time to the synchronization unit 330. That is, the player 322 sends the playback time of the AV media to the synchronization unit 330 while playing back the AV media in a predetermined cycle.

The synchronization unit 330 synchronizes the playback of the AV media with the device control time. That is, the synchronization unit 330 synchronizes the device control time for providing the sensory effects with the AV media playback time provided by the AV representation unit 320.

The sensory effect representation unit 340 analyzes sensory effect data, performs mapping to a corresponding device, and creates control instructions. The sensory effect representation unit 340 controls the device based on the sensory effect metadata message received via the sensory effect message reception unit 380. The sensory effect representation unit 340 controls the playback of the media and the representation of the sensory effects in response to user interaction events. The control of the representation of the sensory effects may include the deletion of the sensory effects, the adjustment of the intensity of the sensory effects, and a change in the level of the sensory effects. For this purpose, as shown in FIG. 13, the sensory effect representation unit 340 includes a metadata analyzer 341, a metadata controller 342, a sensory effect timer 343, a sensory effect handler 344, a device mapper 345, and an instruction creator 346.

The metadata analyzer 341 receives the sensory effect data separated from the convergence media from the convergence media parser 314. The metadata analyzer 341 analyzes the sensory effect data for each sensory effect. The metadata analyzer 341 sends the results of the analysis to the metadata controller 342.

The metadata controller 342 determines whether the sensory effect data is data about continuous sensory effects or data about discontinuous sensory effects based on the results of the analysis performed by the metadata analyzer 341. Here, the metadata controller 342 sends the corresponding sensory effect data to the continuous sensory effect handler 362 if the sensory effect data is data about continuous sensory effects. Additionally, the metadata controller 342 sends the corresponding sensory effect data to the sensory effect timer 343. Here, the metadata controller 342 may receive sensory effect metadata from an external program, such as a game, and represent sensory effects. That is, the metadata controller 342 receives a sensory effect message corresponding to a user interaction event that is detected when a user interaction occurs in a game program, from the sensory effect message transmission unit 370. The metadata controller 342 represents sensory effects based on the received sensory effect message.

The sensory effect timer 343 checks the representation times of the sensory effects, and arranges the sensory effects. That is, the sensory effect timer 343 checks the representation times of the sensory effect data received from the metadata controller 342, arranges the sensory effects, and stores the arranged sensory effects in a stack.

The sensory effect handler 344 represents the sensory effects that were arranged by the sensory effect timer 343. That is, if the sensory effect data is sensory effect data for simply representing sensory effects, the sensory effect handler 344 takes sensory effect metadata out of the stack in order of timeout in the sensory effect timer 343, and processes the sensory effect metadata. In contrast, if the sensory effect data is sensory effect data for user interaction, the sensory effect data is processed not by the sensory effect handler 344 but by an interaction sensory effect handler 395 (which will be described later). That is, if the sensory effect data is sensory effect data for user interaction, the interaction sensory effect handler 395 takes the sensory effect metadata out of the stack in order of timeout.

The device mapper 345 performs mapping to a device for representing the sensory effects.

The instruction creator 346 creates control instructions and sends the control instructions to the device control unit 350, in order to control the device to which mapping was performed by the device mapper 345.

The device control unit 350 provides the sensory effects by controlling the device via a device matching interface. That is, the device control unit 350 controls the device, such as a 4D chair, via the matching interface. If the sensory effect data is data about discontinuous sensory effects, the device control unit 350 determines whether the sensory effect data is sensory effect data for simply representing sensory effects or sensory effect data for user interaction. For this purpose, the device control unit 350 controls the corresponding device in response to the control instructions created by the instruction creator 346. Here, the device control unit 350 receives synchronization signals from the synchronization unit 330 and controls the device.

The continuous data representation unit 360 represents the continuous sensory effects. That is, the continuous data representation unit 360 represents the continuous sensory effects by controlling a device such as a 4D chair which can be continuously moved. For this purpose, as shown in FIG. 14, the continuous data representation unit 360 includes a continuous sensory effect handler 362 for controlling the continuous sensory effects based on the sensory effect metadata from the metadata controller 342 and the sensory effect timer 343. Here, the continuous sensory effect handler 362 performs mapping to a device for representing the continuous sensory effects, and sends data about the mapping to the instruction creator 346. The instruction creator 346 creates continuous control instructions for controlling a device, such as a 4D chair, based on data that is given in the form of 3D coordinate values.

The sensory effect message transmission unit 370 sends a sensory effect message, created in an external program such as a game, to the sensory effect message reception unit 380. That is, the sensory effect message transmission unit 370 creates a sensory effect message based on an event that occurred in the external terminal 200 (or an external program), and sends the sensory effect message to the sensory effect message reception unit 380. For this purpose, as shown in FIG. 15, the sensory effect message transmission unit 370 includes a game event handler 372 for sensing an event that has occurred in the external terminal 200 (or an external game program) and a sensory effect message transmitter 374 for, if the game event handler 372 senses an event corresponding to sensory effects, creating a sensory effect message and sending the sensory effect message to the sensory effect message reception unit 380. Here, the sensory effect message transmission unit 370 may be constructed in the external terminal 200 (that is, the external terminal 200 on which an external program is running).

The sensory effect message reception unit 380 receives the sensory effect message from the sensory effect message transmission unit 370. Here, the sensory effect message reception unit 380 receives the sensory effect message in the form of metadata from the sensory effect message transmission unit 370 (or the external program). The sensory effect message reception unit 380 analyzes the types and representation viewpoints of the sensory effects by analyzing the received sensory effect message, and sends the results of the analysis to the metadata controller 342. For this purpose, as shown in FIG. 15, the sensory effect message reception unit 380 includes a sensory effect message receiver 382 for receiving the sensory effect message from the sensory effect message transmission unit 370 and a sensory effect message analyzer 384 for determining the types and representation viewpoints of the sensory effects by analyzing the sensory effect message received via the sensory effect message receiver 382. Here, the sensory effect message receiver 382 receives the sensory effect message in the form of metadata from the sensory effect message transmission unit 370. The sensory effect message analyzer 384 determines the types of sensory effects and the times when the sensory effects will be represented by analyzing the sensory effect message in the form of metadata. The sensory effect message analyzer 384 sends the results of the analysis to the metadata controller 342.

The interaction processing unit 390 transfers the user interaction event to the sensory effect representation unit 340 so that it is possible to receive the user interaction event and perform an action based on the definition of the interaction sensory effect event while the sensory effects are being represented by the sensory effect representation unit 340 and also the media is being played back. For this purpose, as shown in FIG. 16, the interaction processing unit 390 includes an interaction detector 391, an interaction event handler 392, an interaction event analyzer 393, an interaction event mapper 394, an interaction sensory effect handler 395, and an interaction action performer 396.

The interaction detector 391 senses the user interaction event that occurs while the sensory effects are being represented. That is, a user may generate a user interaction event while the sensory effects or interaction sensory effects are being represented. Accordingly, the interaction detector 391 detects a user interaction event that is generated by an interaction device via a camera, a sensor, voice or the like. The interaction detector 391 provides the detected user interaction event to the interaction event handler 392.

The interaction event handler 392 analyzes the user interaction event detected by the interaction detector 391. That is, the interaction event handler 392 analyzes which of a motion recognition-based interaction event, a sensor data-based interaction event and a voice-based interaction event corresponds to the received user interaction event. The interaction event handler 392 sends the results of the analysis to the interaction event analyzer 393.

The interaction event analyzer 393 determines the type of interaction event by analyzing the user interaction event received from the interaction event handler 392. That is, the interaction event analyzer 393 analyzes, in the case of the motion-related interaction event, whether the motion corresponds to the waving of a hand or the stopping of a hand, in the case of the sensor-related interaction event, whether the movement is a downward movement or an upward movement, and, in the case of the voice-related interaction event, whether the voice corresponds to a word and a syllable.

The interaction event mapper 394 maps the user interaction event, analyzed by the interaction event analyzer 393, to an interaction sensory effect event. That is, the interaction event mapper 394 checks whether the analyzed user interaction event is mapped to an interaction sensory effect event which was defined in the convergence media. If the analyzed user interaction event is mapped to the interaction sensory effect event, the interaction event mapper 394 determines the corresponding user interaction event to be an interaction event.

The interaction sensory effect handler 395 controls an action for the user interaction event which has been determined to be an interaction event. That is, if an interaction event defined in the convergence media has been found, the interaction sensory effect handler 395 generates a control signal that is used to perform an action which was defined based on the corresponding interaction event. The interaction sensory effect handler 395 sends the generated control signal to the interaction action performer 396.

The interaction action performer 396 performs the action defined based on the interaction event in response to the control signal from the interaction sensory effect handler 395. Here, if the defined action is related to the control of the player, the interaction sensory effect handler 395 sends a control signal to the player controller 324. If the defined action is related to the control of the sensory effects, the interaction sensory effect handler 395 sends a control signal to the sensory effect handler 344. Accordingly, mapping to a device and synchronization are performed by the sensory effect handler 344, and the action defined based on the interaction is performed.

A method of processing media in a convergence media service platform according to an embodiment of the present invention will be described in detail with reference to the accompanying drawings. FIGS. 17 to 23 are flowcharts illustrating a method of processing media in a convergence media service platform according to an embodiment of the present invention.

Figure 17:
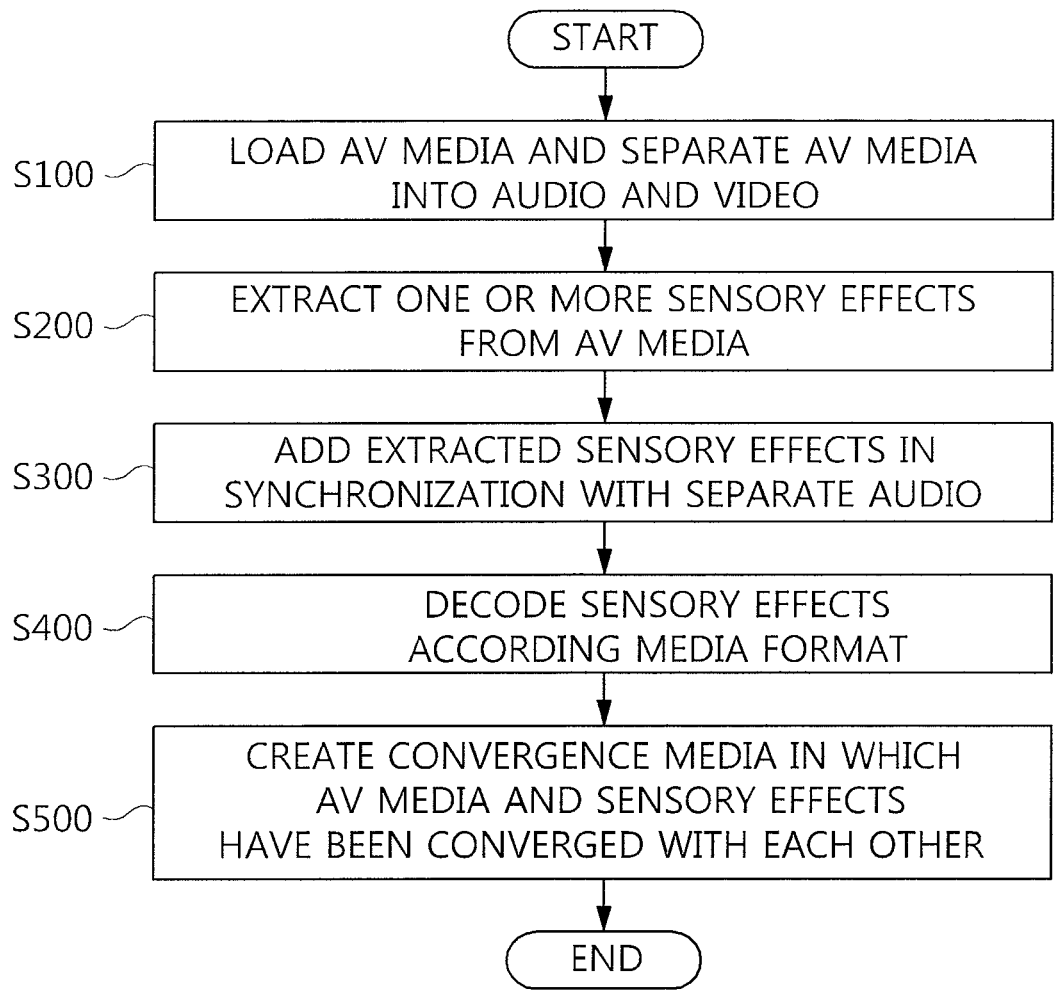
FIGS. 17 to 23 are flowcharts illustrating a method of processing media in a convergence media service platform according to an embodiment of the present invention.
Figure 18:
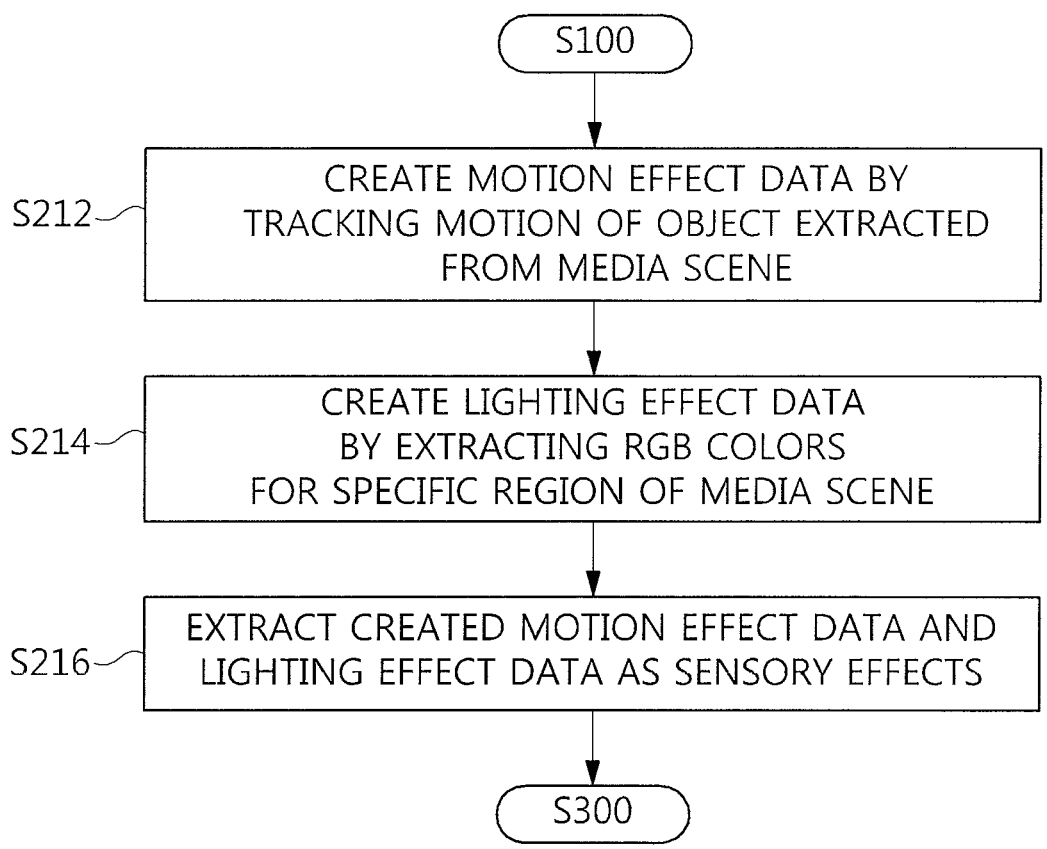
Figure 19:
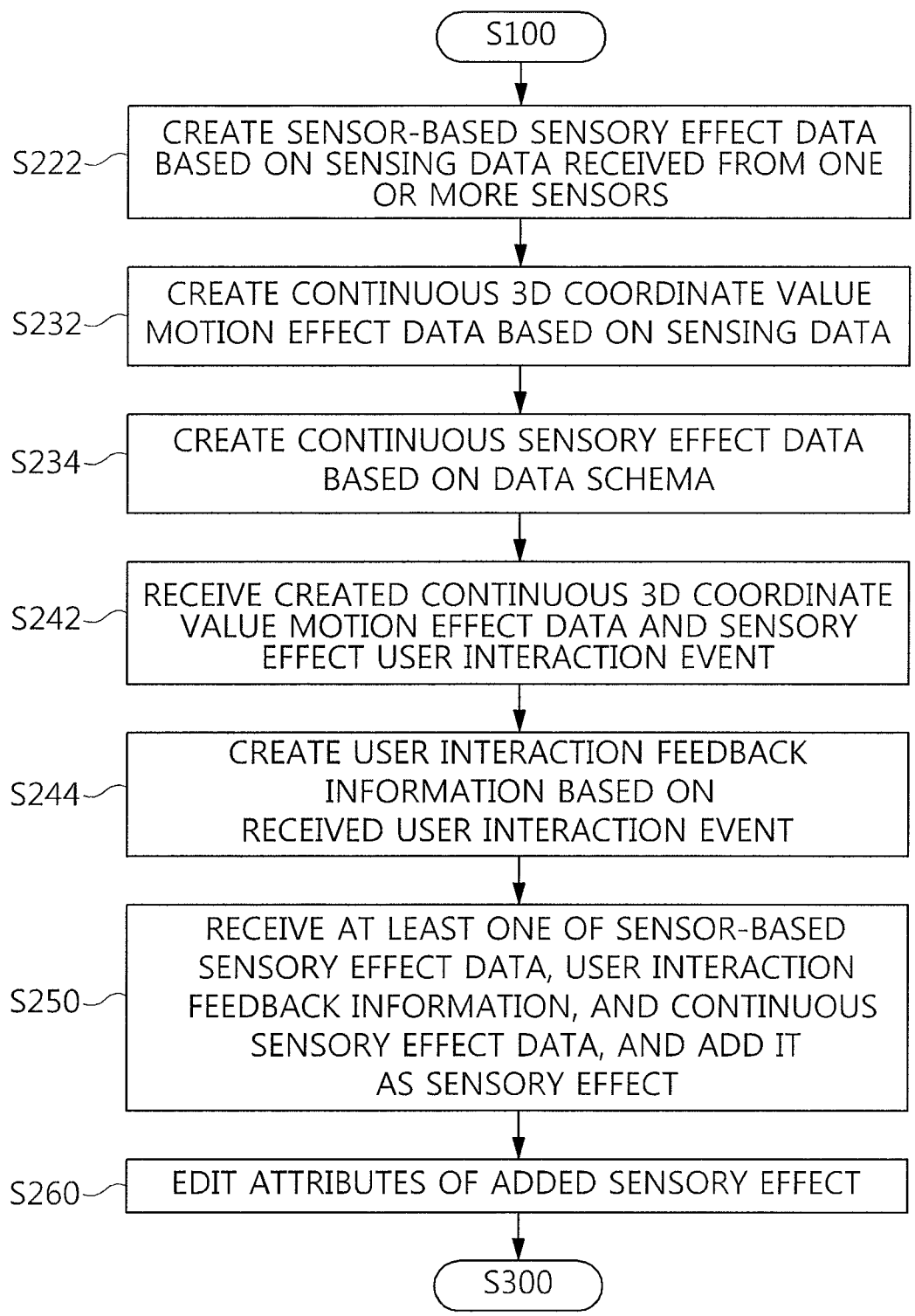

FIG. 17 is a flowchart illustrating a method of creating convergence media, and FIGS. 18 and 19 are flowcharts illustrating a method of extracting sensory effects.

Referring to FIG. 17 first, the convergence media creation unit 100 loads AV media and separates the AV media into audio and video at step S100. That is, the convergence media creation unit 100 loads AV media including no sensory effects. The convergence media creation unit 100 separates the AV media into audio and video.

The convergence media creation unit 100 extracts sensory effects from the AV media at step S200. This will be described in detail below with reference to the accompanying drawings.

As shown in FIG. 18, in the step of extracting sensory effects, the convergence media creation unit 100 creates motion effect data by tracking the motion of an object extracted from a media scene at step S212. That is, the convergence media creation unit 100 extracts the object from the media scene. The convergence media creation unit 100 creates motion effect data by tracking the motion of the extracted object. The convergence media creation unit 100 creates motion effect data about the motion of the media scene based on the camera viewpoint of the media scene.

The convergence media creation unit 100 creates lighting effect data by extracting RGB colors for a specific region of the media scene at step S214. The convergence media creation unit 100 computes the RGB values of respective pixels within each segment region. The convergence media creation unit 100 sets groups of RGB values as representative primary colors, maps the RGB values to the representative primary colors, and computes RGB values with weights given to frequent representative primary colors. The convergence media creation unit 100 computes representative RGB values for respective segment regions using the computed RGB values. The convergence media creation unit 100 performs mapping to RGB patterns that can be represented using an LED lighting device based on the representative RGB values which were computed for the segment regions. The convergence media creation unit 100 selects a pattern having the wide region and the highest similarity from among the RGB patterns mapped for the respective segment regions.

The convergence media creation unit 100 extracts the created motion effect data and the lighting effect data as sensory effects at step S216.

As shown in FIG. 19, in the step of extracting sensory effects, the convergence media creation unit 100 creates sensor-based sensory effect data based on sensing data received from one or more sensors at step S222.

The convergence media creation unit 100 creates continuous 3D coordinate value motion effect data based on the sensing data at step S232. That is, the convergence media creation unit 100 displays continuous data received from a joy stick and continuous data received from a sensor via a 3D viewer. The convergence media creation unit 100 creates sensory effect data based on continuous 3D coordinate values differently from the other sensory effect data. The convergence media creation unit 100 converts motion data received from a joy stick into 3D coordinate values specified for the x, y and z axes. The convergence media creation unit 100 creates continuous data about the motion effects using the obtained 3D coordinate values. The convergence media creation unit 100 creates the created 3D coordinate value motion effect data as continuous data based on data sensed by the acceleration, angular velocity and gyro sensors. The convergence media creation unit 100 represents the continuous motion effect data on the screen using the created 3D coordinate values.

The convergence media creation unit 100 creates continuous sensory effect data based on a data schema at step S234. That is, the convergence media creation unit 100 creates continuous 3D coordinate value sensory effect data in conformity with the sensory effect metadata schema standardized in MPEG-V. Here, the sensory effect data created by the convergence media creation unit 100 is a type of sensory effect, and includes a user interaction.

The convergence media creation unit 100 receives the created continuous 3D coordinate value motion effect data and sensory effect user interaction event at step S242.

The convergence media creation unit 100 creates user interaction feedback information based on the received user interaction event at step S244. That is, the interaction processing unit 113 analyzes a user interaction event that occurs via the interface such as a camera, a sensor, or the voice. The interaction processing unit 113 adds or edits a corresponding sensory effect based on the analyzed user interaction event.

The convergence media creation unit 100 receives at least one of sensor-based sensory effect data, user interaction feedback information and continuous sensory effect data and adds it as a sensory effect at step S250.

The convergence media creation unit 100 edits the attributes of the added sensory effect at step S260. Here, the convergence media creation unit 100 edits the attributes of the sensory effect including the type, location, direction, intensity, level and value of the sensory effect. The convergence media creation unit 100 adds the extracted sensory effect in synchronization with the separate audio at step S300.

The convergence media creation unit 100 decodes the added sensory effect according to the format of the AV media at step S400. That is, the convergence media creation unit 100 decodes the media using the codec 136 suitable for the media format. Here, the convergence media creation unit 100 separately decodes the video and the audio included in the media.

The convergence media creation unit 100 creates convergence media into which the AV media and one or more decoded sensory effects have been converged at step S500. In greater detail, the media creation unit 118 creates single convergence media by combining the media with the sensory effects based on the media format determined by the AV processing unit 111 and user settings. It will be apparent that the media creation unit 118 may create the sensory effects as a file that is separate from that of the media. The media processing unit 119 stores the convergence media created by the camera terminal unit 117, or sends the convergence media to the external server. Here, the convergence media creation unit 100 creates convergence media in which the sensory effect data and the media data have been combined in a single file. It is apparent that the convergence media creation unit 100 may create convergence media in which the sensory effect data and the media data have been formed in respective files.

FIGS. 20 to 23 are flowcharts illustrating a method of representing convergence media.

Figure 20:
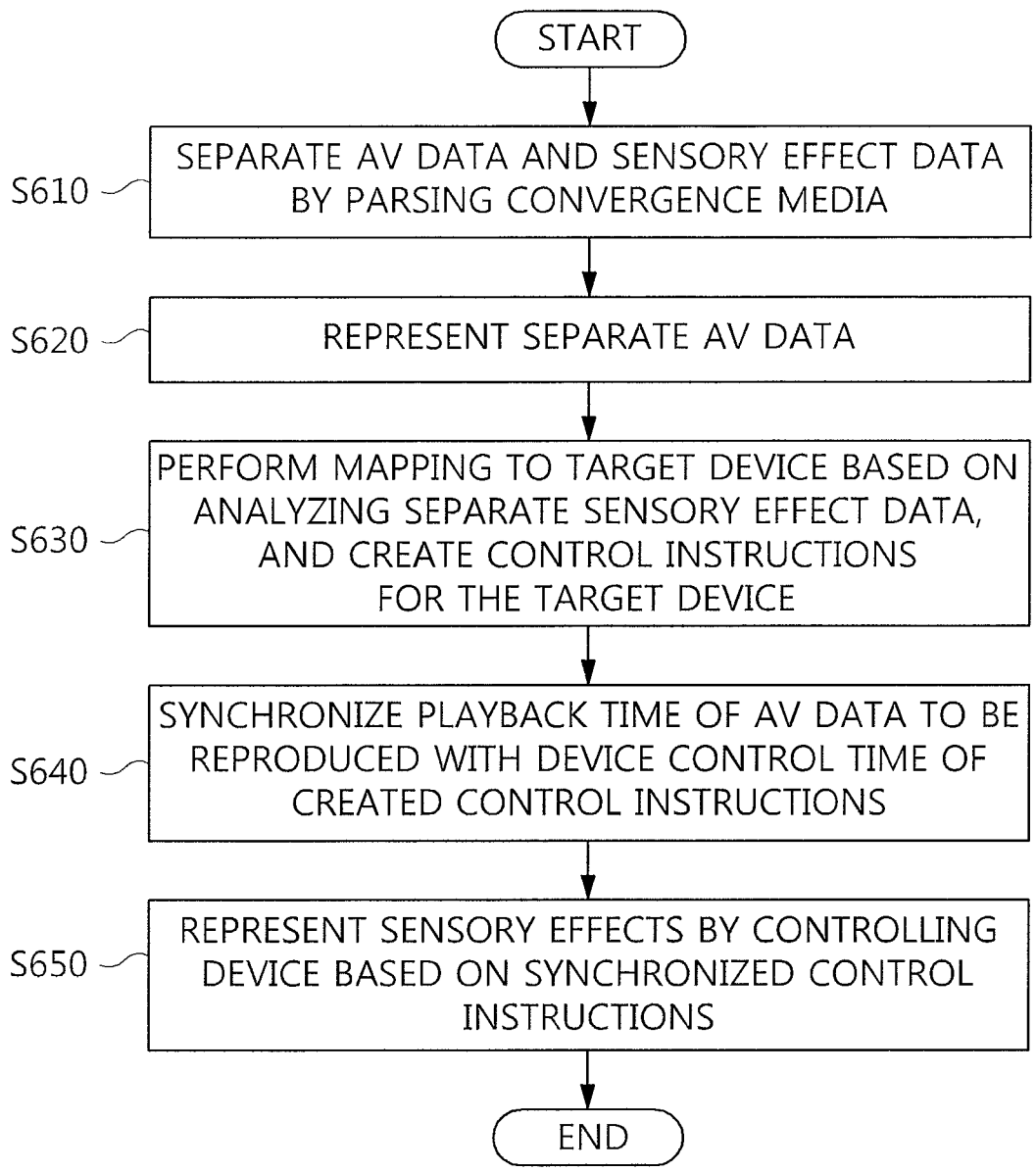

Referring to FIG. 20 first, the convergence media representation unit 300 separates the AV data and the sensory effect data by parsing the convergence media at step S610. That is, the convergence media loader 312 loads the convergence media that was created by the convergence media creation unit 100. The convergence media parser 314 separates the AV data from the loaded convergence media. Here, the convergence media parser 314 sends the separate AV media to the AV representation unit 320 and the separate sensory effect data to the sensory effect representation unit 340.

The convergence media representation unit 300 represents the separate AV data at step S620. That is, the convergence media representation unit 300 represents the separate AV data. The player controller 324 controls the playback of the AV media such as stopping, pausing, playing and fast playing. The player 322 plays back the separate AV data under the control of the player controller 324. Here, the player controller 324 sends the playback time of the AV media to the synchronization unit 330 in a predetermined cycle.

The convergence media representation unit 300 analyzes the separate sensory effect data, performs mapping to a target device and creates control instructions at step S630. That is, the sensory effect representation unit 340 analyzes the sensory effect data, performs mapping to a corresponding device, and creates control instructions.

The convergence media representation unit 300 synchronizes the playback time of the AV data to be reproduced with the device control time of the created control instructions at step S640. That is, the synchronization unit 330 synchronizes the device control time for the provision of the sensory effects with the AV media playback time received from the AV representation unit 320.

The convergence media representation unit 300 represents the sensory effects by controlling the device based on the synchronized control instructions at step S650. Here, the convergence media representation unit 300 represents the sensory effects through the control of the representation of the sensory effects such as the deletion of the sensory effects, the adjustment of the intensity of the sensory effects, and a change in the level of the sensory effects. A method by which the convergence media representation unit 300 represents the sensory effects will be described in detail below.

First, the metadata analyzer 341 receives the sensory effect data that has been separated from the convergence media from the convergence media parser. The metadata analyzer 341 analyzes the sensory effect data for each sensory effect. The metadata analyzer 341 sends the results of the analysis to the metadata controller 342.

The metadata controller 342 determines whether the sensory effect data is data about continuous sensory effects or data about discontinuous sensory effects based on the results of the analysis obtained by the metadata analyzer 341. Here, if the sensory effect data is data about continuous sensory effects, the metadata controller 342 sends the corresponding sensory effect data to the continuous sensory effect handler 362. Additionally, the metadata controller 342 sends the corresponding sensory effect data to the sensory effect timer 343. Here, the metadata controller 342 may receive sensory effect metadata from an external program, such as a game, and represent sensory effects. That is, the metadata controller 342 receives a sensory effect message corresponding to a user interaction event that is detected when a user interaction occurs in a game program, from the sensory effect message transmission unit 370. The metadata controller 342 represents sensory effects based on the received sensory effect message.

The sensory effect timer 343 checks the representation times of the sensory effects, and arranges the sensory effects. That is, the sensory effect timer 343 checks the representation times of the sensory effect data received from the metadata controller 342, arranges the sensory effects, and stores the arranged sensory effects in a stack.

The sensory effect handler 344 represents the sensory effects that were arranged by the sensory effect timer 343. That is, if the sensory effect data is sensory effect data for simply representing sensory effects, the sensory effect handler 344 takes sensory effect metadata out of the stack in order of timeout in the sensory effect timer 343, and processes the sensory effect metadata. In contrast, if the sensory effect data is sensory effect data for user interaction, the sensory effect data is processed not by the sensory effect handler 344 but by an interaction sensory effect handler 395. That is, if the sensory effect data is sensory effect data for user interaction, the interaction sensory effect handler 395 takes the sensory effect metadata out of the stack in order of timeout.

The device mapper 345 performs mapping to a device for representing the sensory effects. The instruction creator 346 creates control instructions and sends the control instructions to the device control unit 350, in order to control the device to which mapping was performed by the device mapper 345.

The device control unit 350 provides the sensory effects by controlling the device via a device matching interface. That is, the device control unit 350 controls the device, such as a 4D chair, via the matching interface. If the sensory effect data is data about discontinuous sensory effects, the device control unit 350 determines whether the sensory effect data is sensory effect data for simply representing sensory effects or sensory effect data for user interaction. For this purpose, the device control unit 350 controls the corresponding device in response to the control instructions created by the instruction creator 346. Here, the device control unit 350 receives synchronization signals from the synchronization unit 330, and controls the device.

Figure 21:
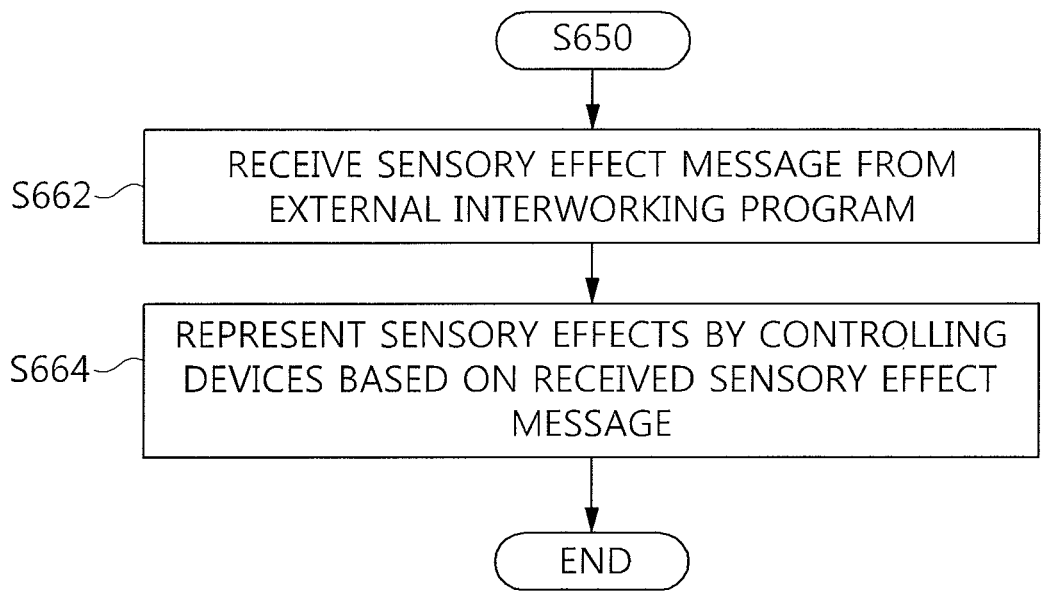

The convergence media representation unit 300 may represent the sensory effects by controlling the device via a sensory effect metadata message that is received from an external interworking program. That is, as shown in FIG. 21, the convergence media representation unit 300 receives the sensory effect message from the external interworking program at step S662. That is, the sensory effect message transmission unit 370 creates a sensory effect message based on an event that occurs in the external terminal 200 (or an external program) and sends the sensory effect message to the sensory effect message reception unit 380. For this purpose, when the game event handler 372 which detects events in the external terminal 200 (or an external game program) detects an event corresponding to a sensory effect, the sensory effect message transmitter 374 creates a sensory effect message and then sends the sensory effect message to the sensory effect message reception unit 380.

The sensory effect message reception unit 380 receives the sensory effect message from the sensory effect message transmission unit 370. Here, the sensory effect message reception unit 380 receives the sensory effect message in the form of metadata from the sensory effect message transmission unit 370 (or the external program). The sensory effect message reception unit 380 analyzes the types and representation viewpoints of the sensory effects by analyzing the received sensory effect message, and sends the results of the analysis to the metadata controller 342.

The convergence media representation unit 300 represents the sensory effects by controlling the device based on the received sensory effect message at step S664. Here, since the method of representing the sensory effects by controlling the device is the same as that of the above-described step S650, a detailed description thereof will be omitted.

Figure 22:
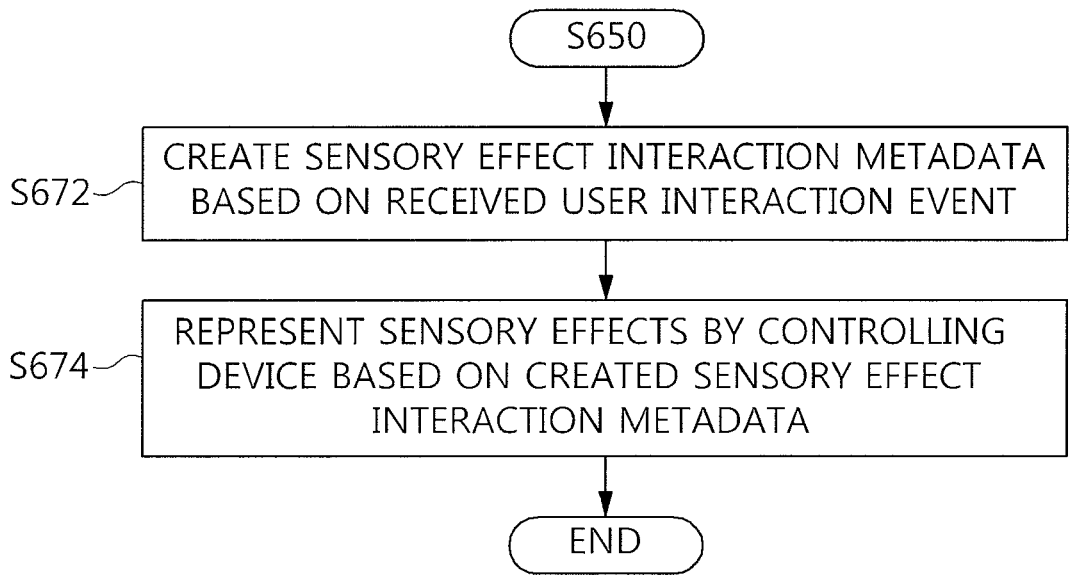

The convergence media representation unit 300 may play back media and represent sensory effects in response to user interaction events. That is, as shown in FIG. 22, the convergence media representation unit 300 creates sensory effect interaction metadata based on the received user interaction event at step S672. This will be described in greater detail below.

First, the interaction detector 391 senses the user interaction event that occurs while the sensory effects are being represented. That is, a user may generate a user interaction event while the sensory effects or interaction sensory effects are being represented. Accordingly, the interaction detector 391 detects a user interaction event that is generated by an interaction device via a camera, a sensor, or the voice. The interaction detector 391 provides the detected user interaction event to the interaction event handler 392.

The interaction event handler 392 analyzes the user interaction event detected by the interaction detector 391. That is, the interaction event handler 392 analyzes which of a motion recognition-based interaction event, a sensor data-based interaction event and a voice-based interaction event corresponds to the received user interaction event. The interaction event handler 392 sends the results of the analysis to the interaction event analyzer 393.

The interaction event analyzer 393 determines the type of interaction event by analyzing the user interaction event which is received from the interaction event handler 392. That is, the interaction event analyzer 393 analyzes, in the case of a motion-related interaction event, whether the motion corresponds to the waving of a hand or the stopping of a hand, in the case of the sensor-related interaction event, whether the movement is a downward movement or an upward movement, and, in the case of the voice-related interaction event, whether the voice corresponds to a word and a syllable.

The interaction event mapper 394 maps the user interaction event, analyzed by the interaction event analyzer 393, to an interaction sensory effect event. That is, the interaction event mapper 394 checks whether the analyzed user interaction event is mapped to an interaction sensory effect event which was defined in the convergence media. If the analyzed user interaction event is mapped to the interaction sensory effect event, the interaction event mapper 394 determines the corresponding user interaction event to be an interaction event.

The convergence media representation unit 300 represents the sensory effects by controlling the device based on the created sensory effect interaction metadata at step S674. This will be described in detail below.

First, the interaction sensory effect handler 395 controls an action for a user interaction event which has been determined to be an interaction event. That is, if an interaction event defined in the convergence media has been found, the interaction sensory effect handler 395 generates a control signal that is used to perform an action which was defined based on the corresponding interaction event. The interaction sensory effect handler 395 sends the generated control signal to the interaction action performer 396.

The interaction action performer 396 performs the action defined based on the interaction event in response to the control signal from the interaction sensory effect handler 395. Here, if the defined action is related to the control of the player, the interaction sensory effect handler 395 sends a control signal to the player controller 324. If the defined action is related to the control of the sensory effects, the interaction sensory effect handler 395 sends a control signal to the sensory effect handler 344. Accordingly, mapping to a device and synchronization are performed by the sensory effect handler 344, and the action defined based on the interaction is performed.

Figure 23:
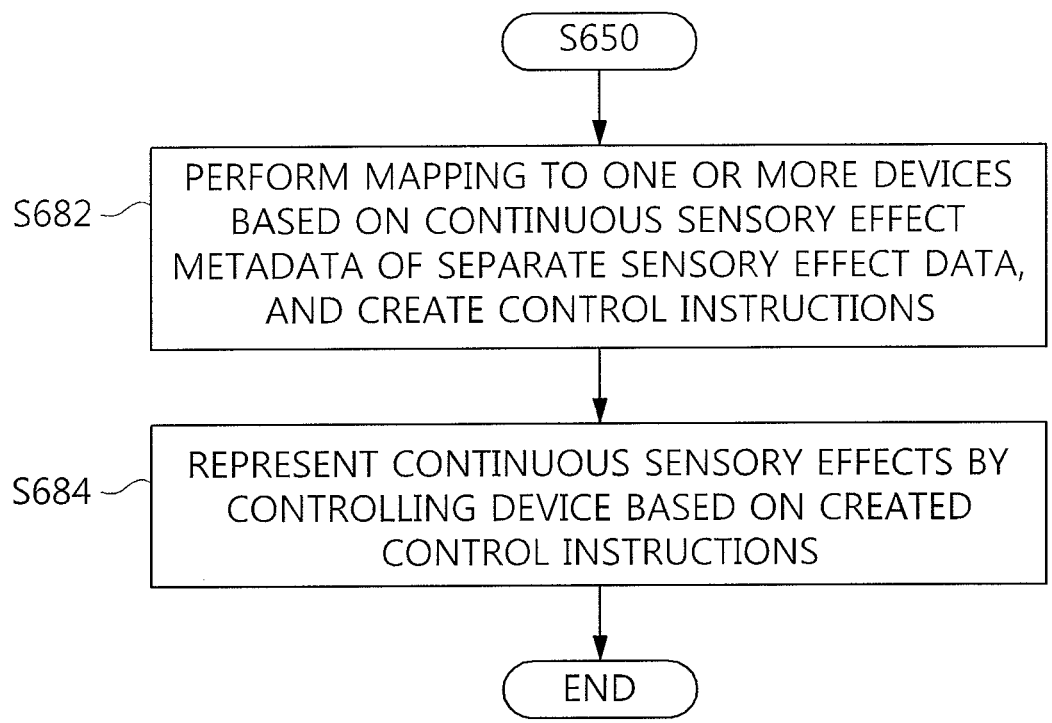

The convergence media representation unit 300 may represent continuous sensory effects. That is, as shown in FIG. 23, the convergence media representation unit 300 performs mapping to a device based on the continuous sensory effect metadata of the separate sensory effect data and creates control instructions at step S682. Here, the convergence media representation unit 300 creates continuous control instructions for the device, such as a 4D chair, based on data which is given in the form of 3D coordinate values.

The convergence media representation unit 300 represents the continuous sensory effects by controlling the device based on the created control instructions at step 684. Here, the convergence media representation unit 300 represents continuous sensory effects by controlling the device, such as a 4D chair that can be continuously moved.

As described above, the apparatus and method for processing media in a convergence media service platform have the advantage of automatically creating one or more extract sensory effects such as motion and lighting effect, based on media and creating sensory effect metadata, unlike the conventional technologies that are configured to manually add one or more sensory effects to a previously created video using an authoring tool and represent the sensory effects using a representation system as created ne-media is played back.

Furthermore, the apparatus and method for processing media in a convergence media service platform have the advantages of providing autonomy and convenience to a user because the apparatus and method enable one or more sensory effects to be added via user interactions during the process of creating convergence media by adding sensory effects to the media.

Furthermore, the apparatus and method for processing media in a convergence media service platform have the advantage of enabling the playback of media or sensory effects to be controlled by allowing interaction events during the representation of the sensory effects because the apparatus and method enable interaction sensory effects based on user interactions and actions based on user interaction events to be defined during the process of representing convergence media.

Furthermore, the apparatus and method for processing media in a convergence media service platform have the advantage of providing a user with a sensory effect experience with enhanced immersion because the apparatus and method enable a user to control the playback of media and sensory effects by generating one or more interaction events.

Furthermore, the apparatus and method for processing media in a convergence media service platform have the advantages of allowing a device, such as a joy stick, to be connected and enabling 3D coordinate values continuous data for controlling a continuous motion, such as the motion of a 4D chair, to be added as sensory effects and to be edited.

Furthermore, the apparatus and method for processing media in a convergence media service platform have the advantage of enabling a user to additionally edit a motion effect or the like by intuition because the apparatus and method enable the motion of a 4D chair to be simulated via a 3D viewer by making continuous data work in conjunction with a joy stick and a sensor.

Furthermore, the apparatus and method for processing media in a convergence media service platform have the advantage of enabling sensory effect metadata messages to be sent and received via an external program, such as a game, in response to a user interaction event and enabling sensory effects to be represented based on the sensory effect metadata messages in response to the interactions of a user of the external program.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for creating media in a convergence media service platform, comprising:
 a media-based sensory effect (MSE) processing unit configured to analyze a media scene of Audio/Video (AV) media to which sensory effects are to be added, wherein the MSE processing unit automatically creates one or more sensory effects based on the media scene of the AV media;
 an AV processing unit configured to separate the AV media into an audio and a video, and to decode the AV media based on media format;
 a sensory effect processing unit configured to add the extracted sensory effects in synchronization with a waveform of the separate audio, and to edit attributes of the added sensory effects; and
 a media creation unit configured to create convergence media by adding the added sensory effects to the AV media.

2. The apparatus of claim 1, wherein the MSE processing unit is configured to create motion effect data by tracking a motion of an object extracted from the media scene of the AV media, to create lighting effect data by extracting RGB colors for a specific region of the media scene of the AV media, and to extract the motion effect data and the lighting effect data as the sensory effects.

3. The apparatus of claim 1, further comprising a sensor unit to create sensor-based sensory effect data based on sensing data received from one or more sensors;
 wherein the sensory effect processing unit receives the created sensor-based sensory effect data, adds the created sensor-based sensory effect data as sensory effects, and edits attributes of the added sensory effects.

4. The apparatus of claim 3, further comprising a continuous data processing unit configured to create continuous sensory effect data based on the continuous 3D coordinate value motion effect data, created based on the sensing data of the sensor unit, and a sensory effect metadata schema;
 wherein the sensory effect processing unit receives the continuous sensory effect data, adds the continuous sensory effect data as sensory effects, and edits attributes of the added sensory effects.

5. The apparatus of claim 1, further comprising an interaction processing unit configured to receive a user interaction event and to create user interaction feedback information;
 wherein the sensory effect processing unit receives the user interaction feedback information, adds the user interaction feedback information as sensory effects, and edits attribute of the added sensory effects.

6. A method of processing media in a convergence media service platform, comprising:
 by a convergence media creation unit,
 loading AV media having no sensory effects;
 separating AV media having no sensory effects into an audio and a video;
 extracting one or more sensory effects by analyzing a media scene of the AV media having no sensory effects and creating sensory effects based on the media scene of the AV media;
 adding the extracted sensory effects in synchronization with the separate audio;
 decoding the added sensory effects based on format of the AV media, and
 creating convergence media in which the AV media and the decoded sensory effects have been converged with each other.

7. The method of claim 6, wherein the extracting one or more sensory effects comprises:
 by the convergence media creation unit,
 creating motion effect data by tracking a motion of an object extracted from a media scene;
 creating lighting effect data by extracting RGB colors for a specific region of the media scene; and
 extracting the created motion effect data and the lighting effect data as the sensory effects.

8. The method of claim 6, wherein the adding one or more sensory effects comprises:
 by the convergence media creation unit,
 receiving at least one of sensor-based sensory effect data and user interaction feedback information and continuous sensory effect data, and adding the data as the sensory effects; and
 editing attributes of the added sensory effects.

9. The method of claim 8, wherein the adding one or more sensory effects comprises:
 by the convergence media creation unit,
 creating sensor-based sensory effect data based on sensing data received from one or more sensors.

10. The method of claim 8, wherein the adding one or more sensory effects comprises:
 by the convergence media creation unit,
 creating continuous 3D coordinate value motion effect data based on the sensing data; and
 creating the continuous sensory effect data based on the created continuous 3D coordinate value motion effect data and a sensory effect metadata schema.

11. The method of claim 8, wherein the adding one or more sensory effects comprises:
 by the convergence media creation unit,
 receiving an user interaction event; and
 creating user interaction feedback information based on the received user interaction event.

12. The method of claim 6, further comprising:
 by a convergence media representation unit,
 separating AV data and sensory effect data by parsing convergence media;
 representing the separate AV data;
 mapping to one or more target devices based on analyzing the separate sensory effect data, and creating control instructions for the target devices;
 synchronizing playback time of the represented AV data with device control time of the created control instructions; and
 representing the sensory effects by controlling the devices based on the synchronized control instructions.

13. The method of claim 12, further comprising:
 by the convergence media representation unit,
 receiving a sensory effect message from an external interworking program; and
 representing the sensory effects by controlling the devices based on the received sensory effect message.

14. The method of claim 12, further comprising:
 by the convergence media representation unit,
 creating sensory effect interaction metadata based on a received user interaction event; and
 representing the sensory effects by controlling the devices based on the created sensory effect interaction metadata.

15. The method of claim 12, further comprising:
 by the convergence media representation unit,
 performing mapping to one or more devices based on the continuous sensory effect metadata of the separate sensory effect data and creating control instructions; and representing continuous sensory effects by controlling the devices based on the created control instructions.

* * * * *